(12) United States Patent
Lee et al.

(10) Patent No.: US 10,656,747 B2
(45) Date of Patent: May 19, 2020

(54) TOUCH INPUT PROCESSING METHOD AND ELECTRONIC DEVICE FOR SUPPORTING THE SAME

(71) Applicant: Samsung Electronics Co., Ltd., Suwon-si, Gyeonggi-do (KR)

(72) Inventors: Sung Jun Lee, Suwon-si (KR); Seung Ho Kang, Suwon-si (KR); Ki Won Kim, Suwon-si (KR); Jeong Jin Lee, Seoul (KR); Hye Lin Lee, Suwon-si (KR); Il Joo Chae, Suwon-si (KR); Jae Min Lee, Suwon-si (KR); Min Jung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 15/889,948

(22) Filed: Feb. 6, 2018

(65) Prior Publication Data
US 2018/0224993 A1    Aug. 9, 2018

(30) Foreign Application Priority Data

Feb. 6, 2017    (KR) .................. 10-2017-0016073

(51) Int. Cl.
*G06F 3/041*    (2006.01)

(52) U.S. Cl.
CPC .. *G06F 3/0414* (2013.01); *G06F 2203/04104* (2013.01); *G06F 2203/04105* (2013.01)

(58) Field of Classification Search
CPC ............. G06F 3/044; G06F 3/0414; G06F 2203/04104; G06F 2203/04105; G06F 3/04142; G06F 3/04144
See application file for complete search history.

(56) References Cited

U.S. PATENT DOCUMENTS

| 9,557,861 | B2 | 1/2017 | Park et al. | |
| 2011/0084912 | A1* | 4/2011 | Almalki | G06F 3/041 345/173 |
| 2014/0240261 | A1 | 8/2014 | Heo et al. | |
| 2014/0267161 | A1 | 9/2014 | Park et al. | |

(Continued)

FOREIGN PATENT DOCUMENTS

| KR | 10-2011-0108646 A | 10/2011 |
| KR | 10-2014-0012286 A | 2/2014 |

(Continued)

*Primary Examiner* — Lixi C Simpson
(74) *Attorney, Agent, or Firm* — Jefferson IP Law, LLP

(57) ABSTRACT

An electronic device is provided. The electronic device includes a touch input device, a touch control circuit configured to generate touch information about a touch input detected by the touch input device, at least one processor, and a memory. The memory stores instructions, when executed, causing the at least one processor to obtain touch information about a first touch input at least once from the touch control circuit after a first time when the first touch input begins to a second time when the first touch input is released, obtain at least one of an area of the first touch input or a pressure of the first touch input based on the obtained touch information, and execute a function corresponding to release of the first touch input if the at least one of the area of the first touch input or the pressure of the first touch input meets a specified condition.

15 Claims, 16 Drawing Sheets

(56) References Cited

U.S. PATENT DOCUMENTS

2016/0259468 A1* 9/2016 Huang ................... G06F 3/044
2016/0291833 A1* 10/2016 Ugawa .................. G06F 3/0416
2016/0370894 A1* 12/2016 Povalac ................ G06F 3/0416

FOREIGN PATENT DOCUMENTS

KR   10-2014-0106097 A   9/2014
KR   10-2014-0114242 A   9/2014

* cited by examiner

TOUCH INPUT PROCESSING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Feb. 6, 2017 in the Korean Intellectual Property Office and assigned Serial number 10-2017-0016073, the entire disclosure of which is hereby incorporated by reference.

TECHNICAL FIELD

The present disclosure relates to a touch input processing method and an electronic device for supporting the same. More particularly, the present disclosure relates to a touch input processing method for generating a signal corresponding to release of a touch input if an area or pressure of the touch input is less than or equal to a specified size after the touch input begins and an electronic device for supporting the same.

BACKGROUND

An electronic device, such as a smartphone, may include a touch input device, for example, a touch screen, a touch pad, a digitizer, or the like. The touch input device may process a touch input of a user. For example, if a touch occurs on a specified location of a touch detection region, the touch input device may detect a change in capacitance by the touch on the specific location and may transmit touch information including coordinates of the touched location and the like to a related module.

The touch information may be transmitted, included in a plurality of touch events (or signals) defined for each characteristic of a touch input from a time when the touch input beings to a time when the touch input is released. For example, the touch input device may generate a touch down event using the touch information at a time when a touch object is in contact with a touch detection region, may generate a touch up event using the touch information at a time when the touch object detaches from the touch detection region, and may generate a touch move event at intervals of a specified time using the touch information between a time when the touch object is in contact with the touch detection region and a time when the touch object detaches from the touch detection region. Further, the touch input device may transmit the generated touch event to a related module, such as a processor.

The above information is presented as background information only to assist with an understanding of the present disclosure. No determination has been made, and no assertion is made, as to whether any of the above might be applicable as prior art with regard to the present disclosure.

SUMMARY

An electronic device may perform a function corresponding to a touch input at a time when a touch input is released according to the related art, for example, a time when a touch up event is transmitted from a touch input device. However, in a simple situation where only information about an initial location of a touch input, such as a tap input, is important, a plurality of touch move events before a touch up event is transmitted may be unnecessary information. An operation of processing such unnecessary information may result in a limitation in optimizing processing of a touch input.

Aspects of the present disclosure are to address at least the above-mentioned problems and/or disadvantages and to provide at least the advantages described below. Accordingly, an aspect of the present disclosure is to provide a touch input processing method for generating a signal corresponding to release of a touch input if an area or pressure of the touch input is less than or equal to a specified size after the touch input begins and an electronic device for supporting the same.

In accordance with an aspect of the present disclosure, an electronic device is provided. The electronic device includes a touch input device, a touch control circuit configured to generate touch information about a touch input detected by the touch input device, at least one processor configured to be electrically connected with the touch input device and the touch control circuit, and a memory configured to be electrically connected with the at least one processor. The memory stores instructions, when executed, causing the at least one processor to obtain touch information about a first touch input at least once from the touch control circuit after a first time when the first touch input begins to a second time when the first touch input is released, obtain at least one of an area of the first touch input or a pressure of the first touch input based on the obtained touch information, and execute a function corresponding to release of the first touch input if the at least one of the area of the first touch input or the pressure of the first touch input meets a specified condition.

In accordance with another aspect of the present disclosure, an electronic device is provided. The electronic device includes a touch input device, a touch control circuit, and at least one processor configured to be electrically connected with the touch input device and the touch control circuit. The touch control circuit is configured to generate touch information about a first touch input at least once, the first touch input detected by the touch input device after a first time when the first touch input begins to a second time when the first touch input is released, obtain at least one of an area of the first touch input or a pressure of the first touch input based on the generated touch information, generate a release signal corresponding to release of the first touch input if the at least one of the area of the first touch input or the pressure of the first touch input meets a specified condition, and transmit the release signal to the at least one processor when the release signal is generated.

In accordance with another aspect of the present disclosure, a touch input processing method of an electronic device is provided. The method includes obtaining touch information about a first touch input at least once after a first time when the first touch input begins to a second time when the first touch input is released, obtaining at least one of an area of the first touch input or a pressure of the first touch input based on the obtained touch information, and executing a function corresponding to release of the first touch input if the at least one of the area of the first touch input or the pressure of the first touch input meets a specified condition.

According to embodiments disclosed in the present disclosure, a speed for processing a touch input may be enhanced by generating a virtual signal corresponding to release of the touch input before the touch input is released.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
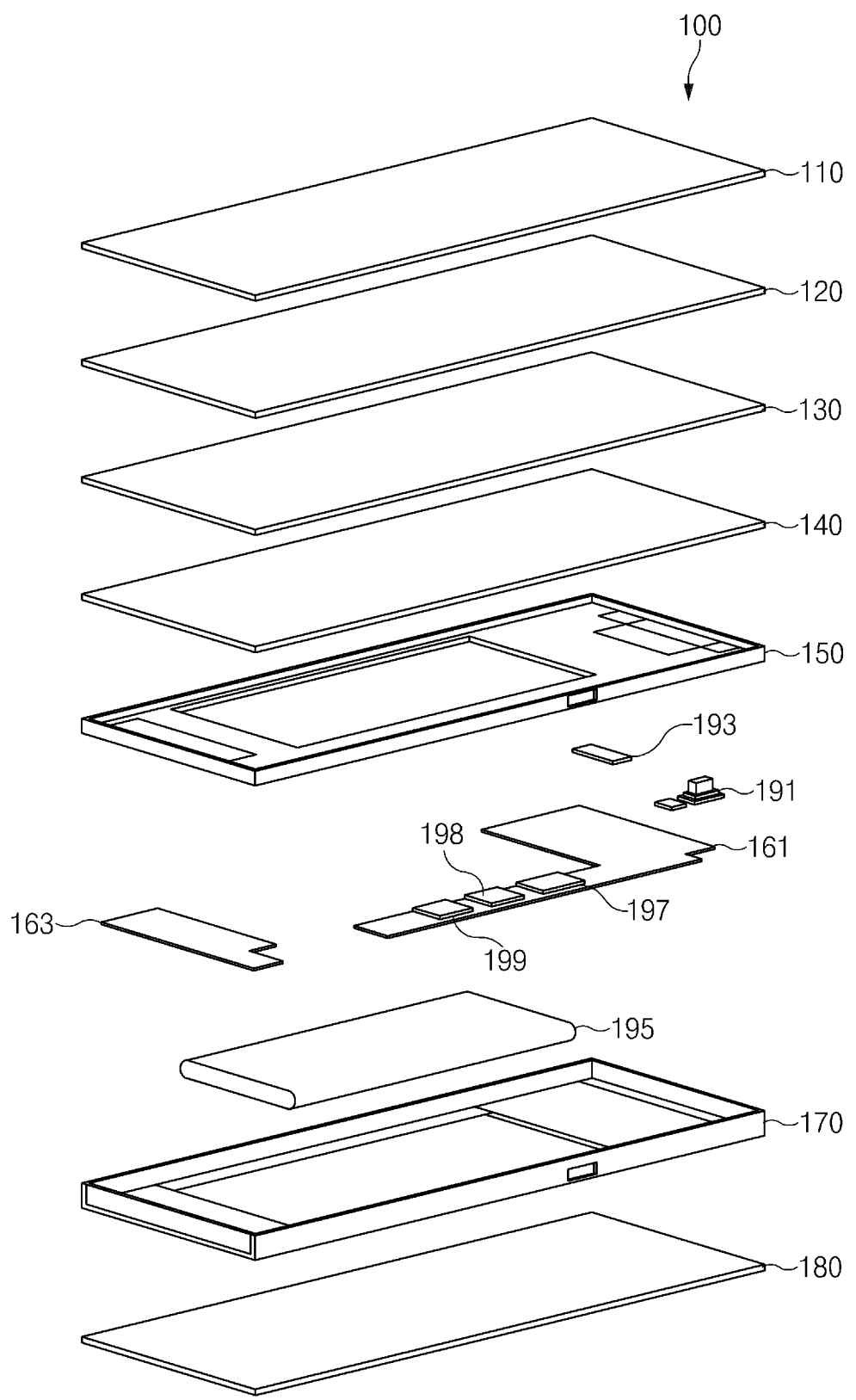
FIG. 1 is an exploded perspective view illustrating an electronic device associated with processing a touch input according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms, such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is an exploded perspective view illustrating an electronic device associated with processing a touch input according to an embodiment of the present disclosure.

Referring to FIG. 1, an electronic device 100 may process a touch input. For example, if a touch object, such as a body's part of a user or an electronic pen (e.g., a stylus pen) is in contact with a display, the electronic device 100 may perform a specified function using touch information including coordinates and the like on a contact location of the touch object. According to an embodiment of the present disclosure, the electronic device 100 may perform a function corresponding to a touch input at a time determined that the touch input will be released, rather than performing the function corresponding to the touch input at a time when the touch input is substantially released, for example, a time when contact between the touch object and the display is released. For example, if the user selects an icon or the like output on the display using the touch object, the electronic device 100 may generate a virtual signal corresponding to release of a touch input to perform a function at a time when the touch object will detach from the display, rather than performing the function according to selection of the icon or the like (e.g., executing an application corresponding to the icon) at a time when the touch object detaches from the display.

According to an embodiment of the present disclosure, the electronic device 100 may determine the time when the touch object will detach from the display, using changes in an area or pressure of a touch input. For example, after a touch input begins, if an area or pressure of the touch input is less than or equal to a specified size, the electronic device 100 may determine that the touch input is being released. The electronic device 100 may enhance a speed of processing the touch input by predicting the release of the touch input and performing a function corresponding to the touch input.

Referring to FIG. 1, the electronic device 100 for performing the above-mentioned function may include a front cover 110, a display (e.g., a touch sensor 120, a display panel 130, or a pressure sensor 140), a bracket 150, a printed circuit board (PCB) (e.g., a first PCB 161 or a second PCB 163), a housing 170, and a rear cover 180. However, the elements of the electronic device 100 are not limited thereto. According to various embodiments of the present disclosure, the electronic device 100 may fail to include at least one of the above-mentioned elements or may further include at least one other element. For example, the electronic device 100 may fail to include the rear cover 180. In this case, a rear surface of the housing 170 may form the rear appearance of the electronic device 100.

The front cover 110 may be located on an upper layer of the display. The front cover 110 may be located in the form of covering the display and may form the front appearance of the electronic device 100. According to an embodiment of the present disclosure, at least partial region of the front cover 110 may be made of a transparent material (e.g., a glass), and a screen output on the display may be displayed to the outside on a transparent region of the front cover 110.

The display may display a variety of content (e.g., text, an image, a video, an icon, a symbol, or the like) to a user. Further, the display may include a touch screen and may receive, for example, a touch, a gesture, proximity, or a hovering input using an electronic pen or a body's part of the user.

The display may be provided with a plurality of layers. According to an embodiment of the present disclosure, the display may include the touch sensor 120, the display panel 130, and the pressure sensor 140. However, the elements of the display are not limited thereto. According to various embodiments of the present disclosure, the display may fail to include at least one of the above-mentioned layers and may further include at least one other layer. For example, the display may further include a fingerprint recognition layer for determining a fingerprint of the user, a heat blocking layer (e.g., a heat sink) for blocking heat generated from the display or heat generated from another element of the electronic device 100, or the like.

The touch sensor 120 may detect contact or proximity of a touch object (e.g., an electronic pen or a body's part of the user). The touch sensor 120 may detect contact or proximity of the touch object through, for example, a pressure type, a resistive type, a capacitive type, an infrared type, an ultrasonic type, an optical type, an electromagnetic induction type, or the like.

According to an embodiment of the present disclosure, the touch sensor 120 may be provided in the form of a panel. For example, the capacitive touch sensor 120 may be provided with a panel in which detecting electrodes formed of a conductive material, such as indium thin oxide (ITO) or a metal mesh are arranged in the direction of a horizontal axis and a vertical axis to be configured as a grating structure. Thus, the touch sensor 120 may detect a touch location using a change in capacitance generated as a touch object is in contact with or close to a detecting electrode.

The touch sensor 120 may measure a physical quantity (e.g., an amount of variation in capacitance) changed by contact or proximity of a touch object and may transmit the measured physical quantity to the processor 197. In this case, the processor 197 may analyze the physical quantity transmitted from the touch sensor 120 to determine whether a touch input occurs. Further, the processor 197 may determine the number of the touch inputs, a location of a touch input, a time when the touch input occurs, duration of the touch input, and the like. In some embodiments of the present disclosure, the touch sensor 120 may analyze a physical quantity directly measured and may generate a touch event (or signal) corresponding to the analyzed result, thus transmitting the generated touch event to the processor 197, rather than transmitting the measured physical quantity to the processor 197. For example, the touch sensor 120 may include a touch control module (e.g., a touch integrated circuit (IC)) capable of processing a touch input.

The display panel 130 may display a screen through color expression of display devices. The display panel 130 may vary in structure and form according to a scheme of expressing a color. For example, the display panel 130 may include a polymer layer, a plurality of display devices located on one surface of the polymer layer, and at least one conductive line electrically connected with the display devices.

The polymer layer may include polyimide. The plurality of display devices may be arranged in a matrix form on one surface of the polymer layer to form pixels of the display panel 130. The plurality of display devices may include a fluorescent material, an organic fluorescent material, or the like capable of expressing a color. For example, the plurality of display devices may include an organic light emitting diode (OLED). The at least one conductive line may form at least one gate signal line or at least one data signal line. According to an embodiment of the present disclosure, a plurality of gate signal lines and a plurality of data signal lines may be arranged in a matrix form, and the plurality of display devices may be located to be adjacent to points where the lines intersect each other and may be electrically connected with the lines.

The display panel 130 may be connected with a display control module (e.g., a display driver IC (DDI)). The display control module may be electrically connected with the at least one conductive line. The display control module may include a driver IC for providing a driving signal and an image signal to the display panel 130 and a timing controller (T-con) for controlling the driving signal and the image signal. The driver IC may include a gate driver IC for sequentially selecting the gate signal line and providing a scan signal (or a driving signal) to the selected gate signal line and a data driver IC (or a source driver IC) for providing an image signal to the data signal line. According to an embodiment of the present disclosure, if the gate driver IC selects the gate signal line and provides a scan signal to the gate signal line to change a corresponding display device to an active state, the data driver IC may provide an image signal to the display device through the data signal line. The timing controller may adjust a transmission time of a signal transmitted to the driver IC to prevent a difference in a display time of a screen.

The pressure sensor 140 may detect, for example, pressure applied from the outside and may convert the detected pressure into an electric signal capable of being used for measurement or control. The pressure sensor 140 may detect pressure through a piezoresistive type, a piezoelectric type, a capacitive type, an inductive type, or the like. The piezoresistive type may be a type using properties in which a resistor formed on a diaphragm varies in resistance value according to stress. The piezoelectric type may be a type of providing displacement or transformation generated in an elastomer by pressure to a piezoelectric element and detecting voltage generated by stress. The capacitive type may be a type using properties in which capacitance between a diaphragm and a fixed electrode is changed according to a bent degree of the diaphragm. The inductive type may be a type of changing inductance in a coil by displacement of a diaphragm and detecting a change in an electromotive force inducted in the coil. In addition, the pressure sensor 140 may be implemented in various manners.

According to various embodiments of the present disclosure, at least one of the touch sensor 120 and the pressure sensor 140 may be provided in the form of being independent of the display rather than being included in the display. For example, the pressure sensor 140 may be provided to be independent of the display and may be combined with the display in the form of being laminated on the display. Further, in the drawing shown, an embodiment is exemplified as the touch sensor 120 is located on an upper layer of the display panel 130 and as the pressure sensor 140 is located on a lower layer of the display panel 130. However, embodiments are not limited thereto. According to various embodiments of the present disclosure, the pressure sensor 140 may be located on an upper layer of the display panel 130 or may be integrated with the touch sensor 120.

The bracket 150 may provide a space in which part (e.g., the display) of the elements included in the electronic device 100 is able to be received. The bracket 150 may include an insulating material. An adhesive material may be coated on a partial region of the bracket 150 or the bracket 150 may include an adhesive layer, such that the part of the elements of the electronic device 100 received in the bracket 150 is fixed. According to an embodiment of the present disclosure, the display may be received in a front surface of the bracket 150, and the front cover 110 may be coupled to the housing 170 in the form of covering part of the front surface of the bracket 150.

According to various embodiments of the present disclosure, the bracket 150 may include at least one opening. The part of the elements of the electronic device 100, received in the bracket 150, may be connection with the PCB through the at least one opening formed in the bracket 150.

The PCB may be located on a lower layer of the bracket 150. A variety of electronic components may be mounted on the PCB. For example, at least one electronic device, a circuit line, or the like may be mounted on the PCB, and at least some of electronic components mounted on the PCB may be electrically connected with each other. The electronic components may include, for example, a processor 197, a memory 198, a communication module 199 (e.g., a communication circuit), a function module (e.g., a camera 191, a speaker 193, or the like), or the like.

According to various embodiments of the present disclosure, the PCB may be integrally provided, and a plurality of PCBs may be separately provided. In the drawing shown, an embodiment is exemplified as the electronic device 100 includes the first PCB 161 and the second PCB 163. If the electronic device 100 includes the plurality of PCBs, some of the plurality of PCBs may be electrically connected with each other. For example, the first PCB 161 and the second PCB 163 may be electrically connected with each other.

The processor 197 may execute an arithmetic operation or data processing about control and/or communication of at least one other element(s) of the electronic device 100. The processor 197 may drive, for example, an operating system (OS) or an application program to control a plurality of hardware or software elements connected to the processor 197 and may perform a variety of data processing or various arithmetic operations. The processor 197 may include one or more of a CPU, an AP, or a communication processor (CP).

According to an embodiment of the present disclosure, the front cover 110 may be implemented as a system on chip (SoC).

The memory 198 may include a volatile and/or nonvolatile memory. For example, the memory 198 may store instructions or data associated with at least one other element of the electronic device 100. According to an embodiment of the present disclosure, the memory 198 may store software and/or a program. The program may include an application. The application may be a set of a series of programs (or instructions) for performing at least one specified function and may include, for example, a message application, an alarm application, a contact information management application, a search application, a mail application, a web search application, or the like. The memory 198 may include, for example, an internal memory or an external memory.

The communication module 199 may establish communication between the electronic device 100 and an external device. The communication module 199 may be connected to, for example, a network through wireless communication or wired communication to communicate with the external device.

The function module may perform at least one of functions provided from the electronic device 100. For example, the function module may include the camera 191 for performing an image capture function, the speaker 193 (or a receiver) for outputting a sound, or the like.

The housing 170 may fix and support internal elements of the electronic device 100. According to an embodiment of the present disclosure, the display, the bracket 150, and the PCB may be laminated in turn to be received in the housing 170. Further, at least one of the function modules may be received and fixed in the housing 170.

The housing 170 may include a front surface, a rear surface, and a side surface which surrounds at least part of a space between the front surface and the rear surface. According to an embodiment of the present disclosure, an opening which penetrates the front surface and the rear surface may be formed in the housing 170 such that a battery 195 is attachable and detachable. However, embodiments are not limited thereto. In some embodiments of the present disclosure, the battery 195 may be integrated with the electronic device 100 such that the opening which penetrates the front surface and the rear surface is not formed in the housing 170. At least one through-hole (or an interfacing hole) may be formed at a side of the housing 170. At least one of the function modules may be exposed to the outside through the through-hole.

The battery 195 may supply power to the elements included in the electronic device 100. For example, the battery 195 may be electrically connected with the PCB and may supply power to electronic components mounted on the PCB. The battery 195 may be received at an inner side of the housing 170. According to various embodiments of the present disclosure, the battery 195 may be integrated with the electronic device 100 and may be removably provided.

The rear cover 180 may form the rear appearance of the electronic device 100. For example, the rear cover 180 may be coupled to the housing 170 in a state where the rear cover 180 covers a rear surface of the housing 170. According to various embodiments of the present disclosure, the rear cover 180 may be attachable or detachable from the housing 170.

Figure 2:
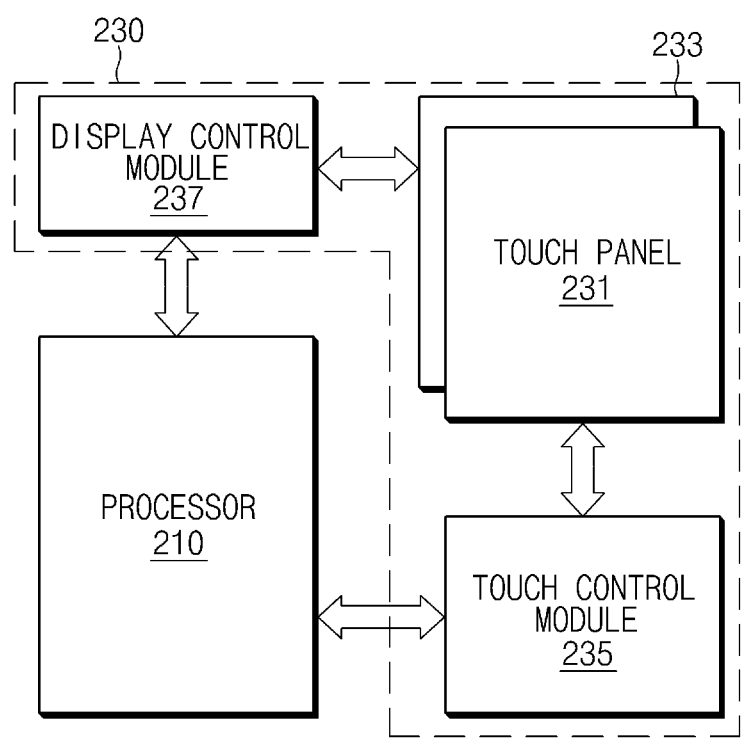
FIG. 2 is a block diagram illustrating a partial configuration of an electronic device associated with processing a touch input according to an embodiment of the present disclosure.

FIG. 2 is a block diagram illustrating a partial configuration of an electronic device associated with processing a touch input according to an embodiment of the present disclosure.

Referring to FIG. 2, an electronic device (e.g., an electronic device 100 of FIG. 1) may include a touch input device 230 for receiving and processing a touch input. The touch input device 230 may include, for example, a touch screen, a touch pad, or the like.

The touch input device 230 may include a touch panel 231, a touch control module 235, and a display control module 237. However, the elements of the touch input device 230 are not limited thereto. A description will be given of various elements of the touch input device 230 with reference to embodiments described below.

The touch panel 231 (e.g., a touch sensor 120 of FIG. 1) may detect contact or proximity of a touch object. The touch panel 231 may be provided with, for example, a panel in which detecting electrodes formed of a conductive material are formed in a grating structure. The touch panel 231 may detect, for example, a touch location using a change in capacitance generated as a touch object is in contact with or close to a detecting electrode.

The touch panel 231 may measure a physical quantity (e.g., an amount of variation in capacitance) changed by contact or proximity of the touch input and may transmit the measured physical quantity to the touch control module 235 (e.g., a touch IC). The touch control module 235 may analyze the transmitted physical quantity to determine whether a touch input occurs. Further, the touch control module 235 may analyze the transmitted physical quantity to obtain touch information, such as a location or area of a touch input.

The touch control module 235 may transmit the obtained touch information to a related module, for example, a processor 210. According to an embodiment of the present disclosure, the touch control module 235 (or the processor 210) may generate a touch event (or signal) associated with the touch input using the touch information and may transmit the generated touch event to a related module. The touch event may include, for example, a touch down (press) event generated at a time when a touch input begins, a touch up (release) event generated at a time when the touch input is released, and at least one touch move event generated at intervals of a specified time between the touch down event and the touch up event. The touch move event may occur at least once between the touch down event and the touch up event. Each of the touch events may include information, such as a time, location, or area of a touch input.

According to an embodiment of the present disclosure, the touch control module 235 (or the processor 210) may predict release of a touch input before the touch input is substantially released. For example, if an area or pressure of the touch input is lower than or equal to a specified size, the touch control module 235 (or the processor 210) may predict that the touch input is released. In this case, the touch control module 235 (or the processor 210) may generate a signal corresponding to the release of the touch input (e.g., a touch up event) in advance and may transmit the generated signal to the related module (e.g., middleware and/or an application). Further, if the touch input is subsequently substantially released, the touch control module 235 (or the processor 210) may disregard the release of the touch input without generating a touch up event corresponding to the release of the touch input.

According to an embodiment of the present disclosure, if an area or pressure of the touch input is reduced a specified number of times, the touch control module 235 may generate a signal corresponding to release of the touch input in advance. For example, only if an area or pressure of the touch input is reduced a predetermined number of times, the touch control module 235 may generate a touch up event and may transmit the touch up event to the processor 210. This is to prevent an error of releasing the touch input to be different from intention of a user to some degree, when the touch input module 235 predicts the release of the touch input.

More particularly, when a user touches the touch input device 230 using his or her finger, force applied to the finger may fail to be equal. For example, while the user touches the touch input device 230 with force corresponding to a first level using his or her finger and detaches the finger from the touch input device 230, he or she may maintain the touch of the touch input device 230 with force corresponding to a second level lower than the first level, but may maintain the touch of the touch input device 230 with force corresponding to a third level higher than the first level. In this case, in a state where the user maintains the touch of the touch input device 230 with the force corresponding to the second level using his or her finger, if the touch control module 235 generates a touch end event and, while the user maintains the touch of the touch input device 230 with the force corresponding to the third level using his or her finger, if he or she touches the touch input device 230 with the force of the second level again, the touch control module 235 may generate an error of generating the touch up event again. Thus, the touch control module 235 may prevent an error of generating the touch up event several times by generating the touch end event only once if an area or pressure of a touch input is reduced a predetermined number of times.

According to an embodiment of the present disclosure, the touch control module 235 may determine the number of times that an area or pressure of a touch input is reduced, at intervals of a specified time. For example, the touch control module 235 may determine the number of times that the area or pressure of a touch input is reduced, using touch information used when generating a touch move event at intervals of the specified time.

According to an embodiment of the present disclosure, the touch control module 235 may set a reference value for determining the number of times that the area or pressure of the touch input is reduced. For example, the reference value may be set to an area or pressure of a touch input, measured at a time when the touch input begins. Alternatively, the reference value may be set to a maximum value of an area or pressure of the touch input. For example, when the user touches the touch input device 230 using his or her finger, an initial area or pressure of a touch input may be smaller than an area or pressure of a touch input after a predetermined time. Thus, the touch control module 235 may accurately predict release of the touch input by setting the maximum value of the area or pressure of the touch input as the reference value.

The display panel 233 (e.g., a display panel 130 of FIG. 1) may display a screen through color expression of display devices. The display panel 233 may be connected with the display control module 237 (e.g., a DDI). The display control module 237 may receive a signal associated with displaying a screen from the processor 210 and may control the display panel 233 depending on the received signal.

According to an embodiment of the present disclosure, the touch panel 231 and the display panel 233 may be integrated with each other or may be implemented to be independent of each other.

The processor 210 may transmit a signal (or a touch event) transmitted from the touch input device 230 to another related module (e.g., middleware and/or an application) or may directly process the signal. For example, if receiving the touch up event from the touch input device 230, the processor 210 may perform a function corresponding to the received touch up event. For example, if receiving a touch up event generated if the user selects an icon output on a screen, the processor 210 may execute an application corresponding to the icon.

According to an embodiment of the present disclosure, the processor 210 may execute an arithmetic operation or data processing associated with control and/or communication of at least one other element(s) of an electronic device (e.g., an electronic device 100 of FIG. 1). The processor 210 may load instructions or data received from at least one of other elements (e.g., a nonvolatile memory) into a volatile memory to process the loaded instructions or data and may store various data in a nonvolatile memory. According to an embodiment of the present disclosure, although not illustrated, the processor 210 may load instructions or data associated with processing a touch input, stored in a memory, into a volatile memory and may process the loaded instructions or data depending on a specified program routine. For example, the processor 210 may load a module (e.g., middleware and/or an application) associated with processing a touch input into the memory and may process a generated touch event (e.g., a touch up event or the like) in connection with the related module. For example, the processor 210 may transmit a generated touch up event to the middleware, and the middleware may transmit the touch up event to an application which is currently being executed in the foreground. Alternatively, the processor 210 may directly transmit the generated touch up event to the application.

Figure 3:
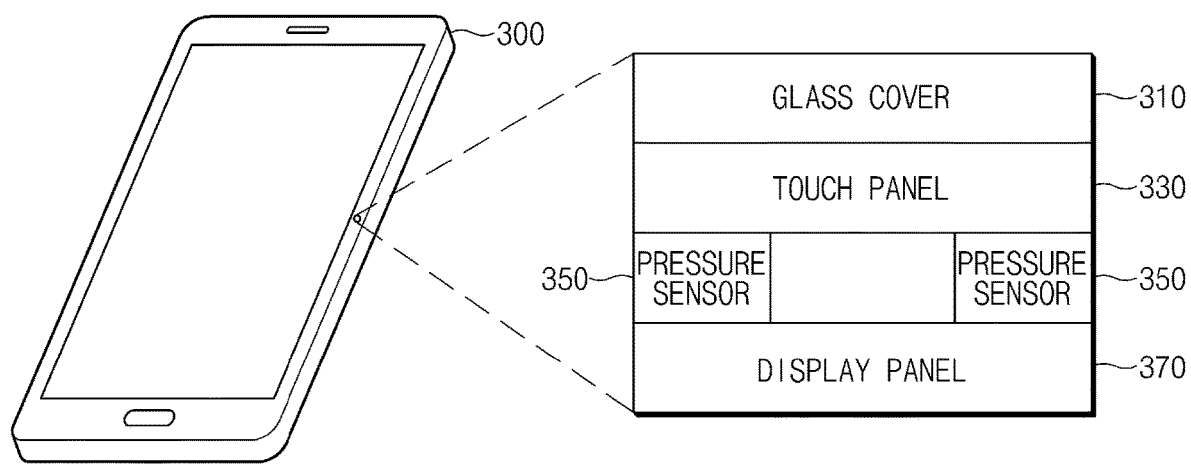
FIG. 3 is a perspective view illustrating an electronic device associated with processing a touch input according to an embodiment of the present disclosure.

FIG. 3 is a perspective view illustrating an electronic device associated with processing a touch input according to an embodiment of the present disclosure.

Referring to FIG. 3, an electronic device 300 may include a touch screen. The touch screen may include a glass cover 310, a touch panel 330, and a display panel 370. In some embodiments of the present disclosure, the touch screen may further include at least one pressure sensor 350.

The cover glass (e.g., a front cover 110 of FIG. 1) may form the front appearance of the electronic device 300. At least a partial region of the glass cover 310 may be formed of a transparent material. A screen output through the display panel 370 may be displayed to the outside through a transparent region of the glass cover 310.

The touch panel 330 (e.g., a touch sensor 120 of FIG. 1) may be located on a lower layer of the glass cover 310. The touch panel 330 may detect contact or proximity of a touch object.

The display panel 370 (e.g., a display panel 130 of FIG. 1) may be located on a lower layer of the touch panel 330. The display panel 370 may display a screen through color expression of display devices.

The pressure sensor 350 (e.g., a pressure sensor 140 of FIG. 1) may detect pressure applied from the outside and may convert the detected pressure into an electric signal capable of being used for measurement or control. According to an embodiment of the present disclosure, the pressure sensor 350 may be located between the touch panel 330 and the display panel 370. The pressure sensor 350 may be located in both periphery regions of the touch screen. However, the location of the pressure sensor 350 is not limited thereto. According to various embodiments of the present disclosure, the pressure sensor 350 may be located on a lower end region of the touch screen or may be distributed and located throughout the entire region of the touch screen. Further, the pressure sensor 350 may be located on a lower layer of the display panel 370 or may be integrated with the touch panel 330.

Figure 4:
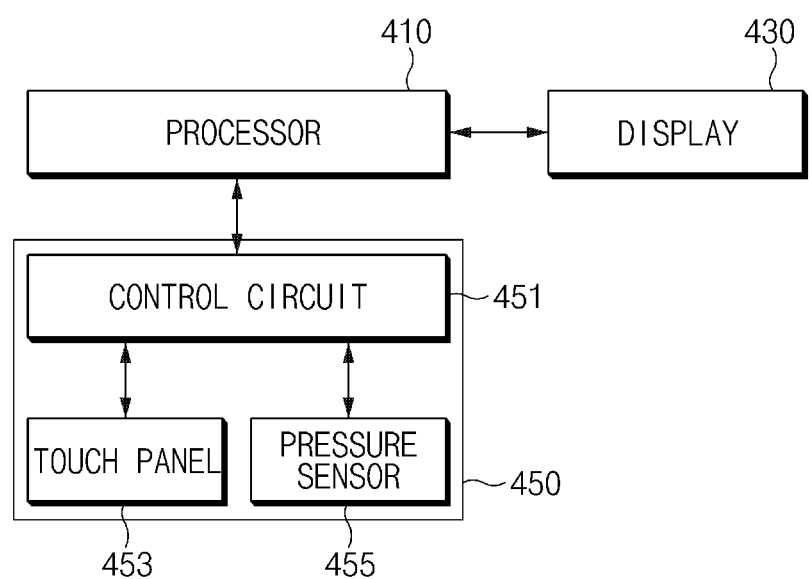
FIG. 4 is a block diagram illustrating a partial configuration of an electronic device associated with processing a touch input according to an embodiment of the present disclosure.

FIG. 4 is a block diagram illustrating a partial configuration of an electronic device associated with processing a touch input according to an embodiment of the present disclosure.

Referring to FIG. 4, in an electronic device (e.g., an electronic device 100 of FIG. 1), a module for processing a touch input may be provided to be independent of a display 430. For example, as shown, a touch input device 450 may be provided to be independent of the display 430. For example, the touch input device 450 may be a touch pad or the like configured to be independent of the display 430.

The touch input device 450 may generate a touch event according to a touch input and may transmit the generated touch event to a processor 410. The touch input device 450 may include a touch panel 453 and/or a pressure sensor 455 for detecting a touch input and may include a control circuit 451 (e.g., a touch control circuit) for processing the detected touch input.

Figure 5:
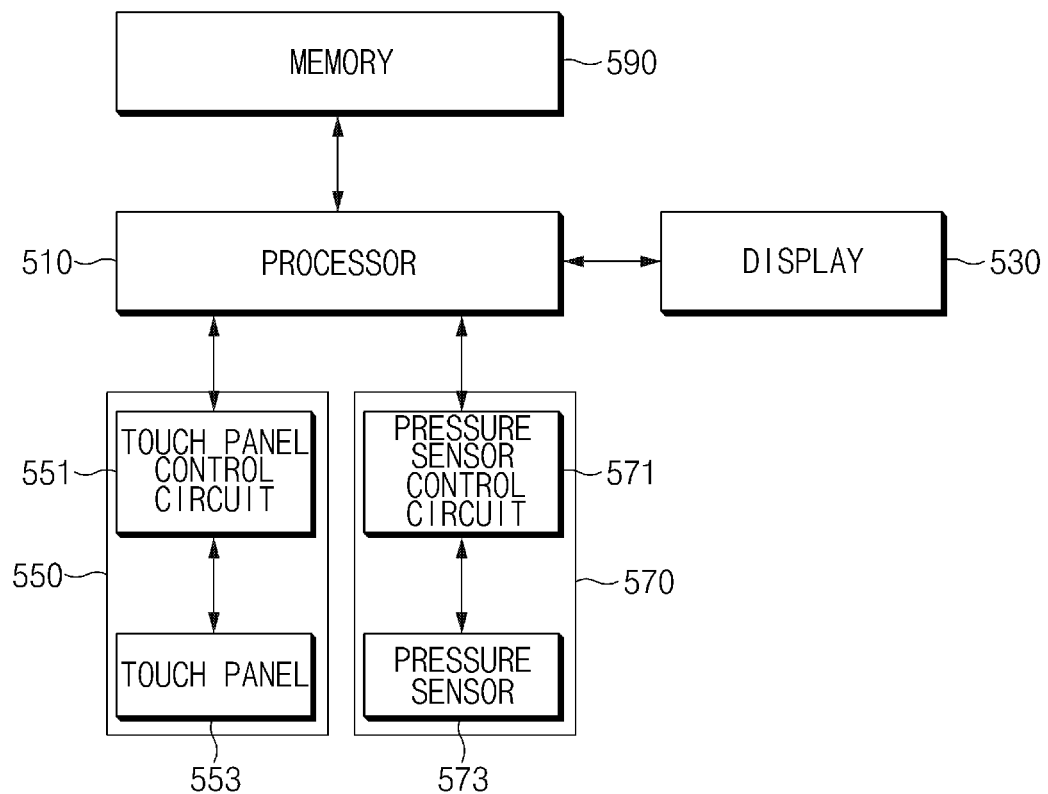
FIG. 5 is a block diagram illustrating a partial configuration of an electronic device associated with processing a touch input according to an embodiment of the present disclosure.

FIG. 5 is a block diagram illustrating a partial configuration of an electronic device associated with processing a touch input according to an embodiment of the present disclosure.

Referring to FIG. 5, in an electronic device (e.g., an electronic device 100 of FIG. 1), a module for processing a touch input may be provided to be independent of a display 530. The module may be provided to be classified according to an area and pressure of a touch input. For example, a touch sensor 550 for performing processing associated with an area upon a touch input and a pressure sensor 570 for performing processing associated with pressure upon the touch input may be provided to be independent of each other.

The touch sensor 550 may include a touch panel 553 for detecting proximity or contact of a touch object and a touch panel control circuit (e.g., a touch control module 235 of FIG. 2) for processing the information detected by the touch panel 553.

The pressure sensor 570 may include a pressure sensor 573 for detecting pressure applied from the outside and converting the detected pressure into an electric signal capable of being used for measurement or control and a pressure sensor control circuit 571 for processing the converted electric signal.

A processor 510 may receive touch information (or a touch event) from the touch panel control circuit 551 or the pressure sensor control circuit 571 and may perform a related function. According to an embodiment of the present disclosure, the processor 510 may store touch information in a memory 590.

As described above, according to various embodiments of the present disclosure, an electronic device (e.g., the electronic device 100) may include a touch input device (e.g., the touch input device 230, 450), a touch control circuit (e.g., the touch control module 235, the control circuit 451) configured to generate touch information about a touch input detected by the touch input device, a processor (e.g., the processor 197, 210, 410) configured to be electrically connected with the touch input device and the touch control circuit, and a memory (e.g., the memory 198) configured to be electrically connected with the processor. The memory may store instructions, when executed, causing the processor to obtain touch information about a first touch input at least once from the touch control circuit after a first time when the first touch input begins to a second time when the first touch input is released, obtain at least one of an area of the first touch input or a pressure of the first touch input based on the obtained touch information, and execute a function corresponding to release of the first touch input if the at least one of the area of the first touch input or the pressure of the first touch input meets a specified condition.

According to various embodiments of the present disclosure, if the function corresponding to the release of the first touch input is executed, the touch control circuit may cease to transmit the touch information about the first touch input to the processor, or the processor may disregard the touch information about the first touch input obtained from the touch control circuit.

According to various embodiments of the present disclosure, the memory may further store instructions, when executed, causing the processor to determine that the specified condition is met if the at least one of the area of the first touch input or the pressure of the first touch input is less than or equal to a first size.

According to various embodiments of the present disclosure, the memory may further store instructions, when executed, causing the processor to determine that the specified condition is met if the at least one of the area of the first touch input or the pressure of the first touch input is less than or equal to a first size and is reduced a specified number of times.

According to various embodiments of the present disclosure, the memory may further store instructions, when executed, causing the processor to execute a function corresponding to release of a multi-touch input where a second touch input begins within a specified time after the first touch input begins if the at least one of the area of the first touch input or the pressure of the first touch input meets the specified condition and at least one of an area of the second touch input or a pressure of the second touch input meets the specified condition.

According to various embodiments of the present disclosure, the memory may further store instructions, when executed, causing the processor to determine that the specified condition is not met if at least one of a first area of the first touch input or a first pressure of the first touch input is greater than or equal to a first size, although at least one of a second area of the first touch input or a second pressure of the first touch input is less than or equal to a second size. The at least one of the first area of the first touch input or the first pressure of the first touch input may be obtained at a third time between the first time and the second time, and the at least one of the second area of the first touch input or the second pressure of the first touch input may be obtained at a fourth time which is between the first time and the second time and is after the third time.

According to various embodiments of the present disclosure, the memory may further store instructions, when executed, causing the processor to determine a change in a region formed by touch coordinates of the first touch input based on a first touch information obtained at a third time between the first time and the second time and a second touch information obtained at a fourth time which is between the first time and the second time and is before the third time, and determine that the specified condition is not met if the region is moved or widened in one direction, although the at least one of the area of the first touch input or the pressure of the first touch input is less than or equal to a first size. And the at least one of the area of the first touch input or the pressure of the first touch input may be obtained at a fifth time which is between the first time and the second time and is after the third time.

According to various embodiments of the present disclosure, the touch input device may include at least one of a touch panel configured to detect contact or proximity of a touch object, and a pressure sensor configured to detect pressure applied by the touch object.

As described above, according to various embodiments of the present disclosure, an electronic device may include a touch input device, a touch control circuit, and a processor configured to be electrically connected with the touch input device and the touch control circuit. The touch control circuit may be configured to generate touch information about a first touch input at least once, the first touch input detected by the touch input device after a first time when the first touch input begins to a second time when the first touch input is released, obtain at least one of an area of the first touch input or a pressure of the first touch input based on the generated touch information, generate a release signal corresponding to release of the first touch input if the at least one of the area of the first touch input or the pressure of the first touch input meets a specified condition, and transmit the release signal to the processor when the release signal is generated.

According to various embodiments of the present disclosure, the touch control circuit may be configured to disregard the first touch input detected by the touch input device after generating the release signal.

According to various embodiments of the present disclosure, the touch control circuit may be configured to determine that the specified condition is met if the at least one of the area of the first touch input or the pressure of the first touch input is less than or equal to a first size.

According to various embodiments of the present disclosure, the touch control circuit may be configured to determine that the specified condition is met if the at least one of the area of the first touch input or the pressure of the first touch input is less than or equal to a first size and is reduced a specified number of times.

According to various embodiments of the present disclosure, the touch control circuit may be configured to generate a release signal corresponding to release of a multi-touch input where a second touch input begins within a specified time after the first touch input begins if the at least one of the area of the first touch input or the pressure of the first touch input meets the specified condition and at least one of an area of the second touch input or a pressure of the second touch input meets the specified condition.

According to various embodiments of the present disclosure, the touch control circuit may be configured to determine that the specified condition is not met if at least one of a first area of the first touch input or a first pressure of the first touch input is greater than or equal to a first size, although at least one of a second area of the first touch input or a second pressure of the first touch input is less than or equal to a second size. The at least one of the first area of the first touch input or the first pressure of the first touch input may be obtained at a third time between the first time and the second time, and the at least one of the second area of the first touch input or the second pressure of the first touch input may be obtained at a fourth time which is between the first time and the second time and is after the third time.

According to various embodiments of the present disclosure, the touch control circuit may be configured to determine a change in a region formed by touch coordinates of the first touch input based on a first touch information obtained at a third time between the first time and the second time and a second touch information obtained at a fourth time which is between the first time and the second time and is before the third time, and determine that the specified condition is not met if the region is moved or widened in one direction, although the at least one of the area of the first touch input or the pressure of the first touch input is less than or equal to a first size. And the at least one of the area of the first touch input or the pressure of the first touch input may be obtained at a fifth time which is between the first time and the second time and is after the third time.

According to various embodiments of the present disclosure, the touch input device may include at least one of a touch panel configured to detect contact or proximity of a touch object, and a pressure sensor configured to detect pressure applied by the touch object.

Figure 6:
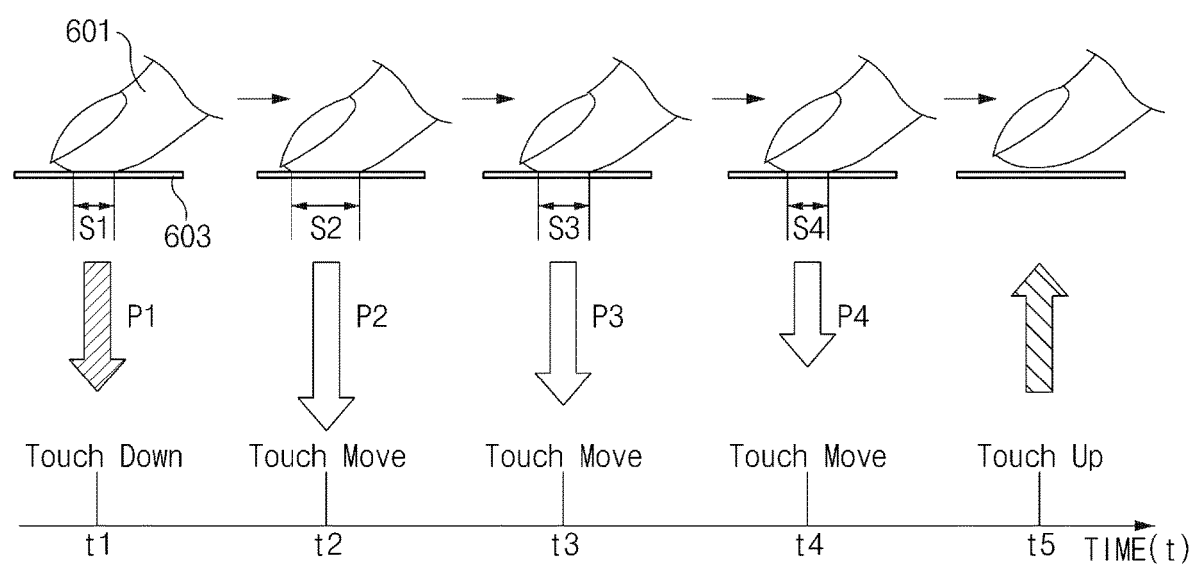
FIG. 6 is a drawing illustrating generation of a touch event according to a touch input according to an embodiment of the present disclosure.

FIG. 6 is a drawing illustrating generation of a touch event according to a touch input according to an embodiment of the present disclosure.

Figure 7:
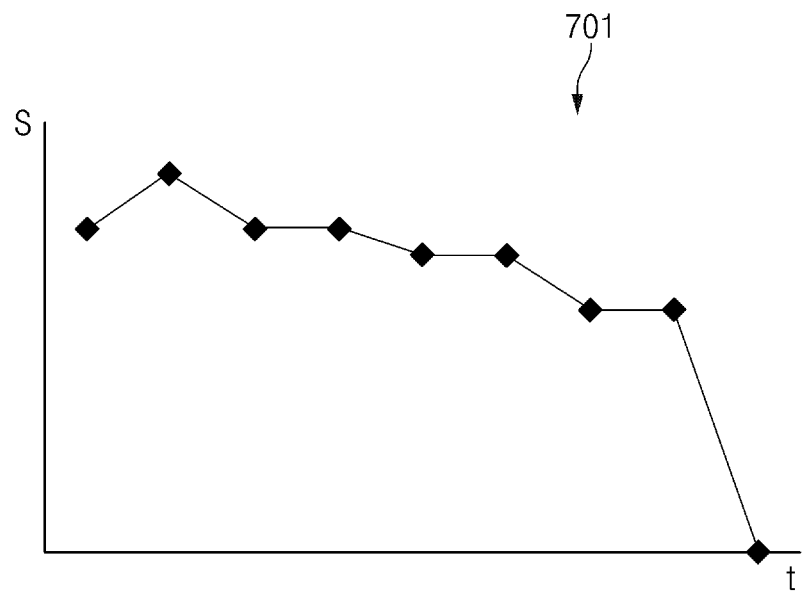
FIG. 7 is a drawing illustrating a change in an area or pressure of a touch input according to an embodiment of the present disclosure.
Figure 7:
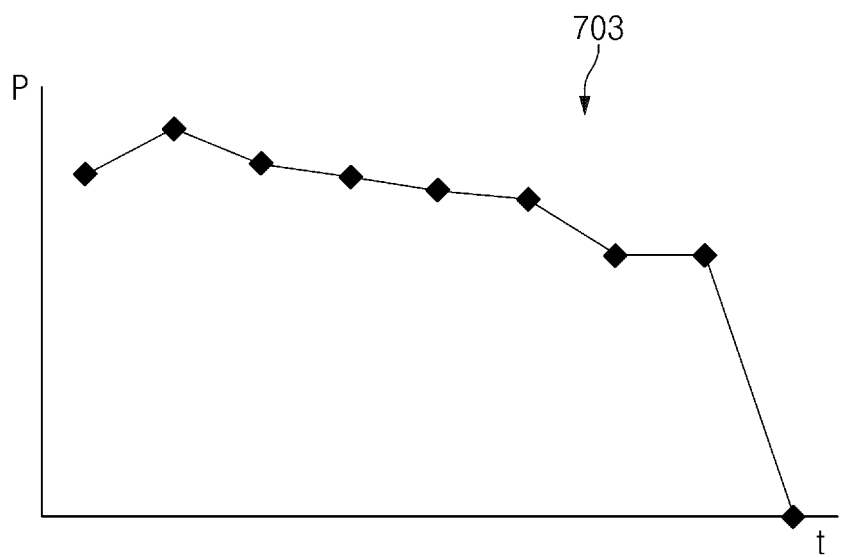

FIG. 7 is a drawing illustrating a change in an area or pressure of a touch input according to an embodiment of the present disclosure.

Figure 8:
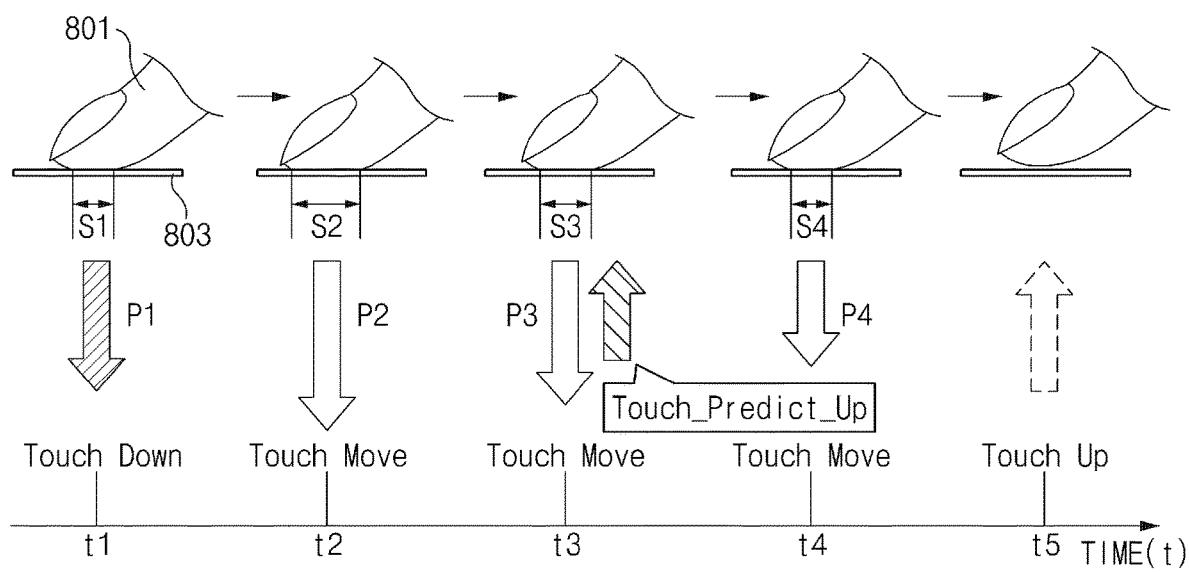
FIG. 8 is a drawing illustrating a method for generating a signal corresponding to release of a touch input depending on an area or pressure of a touch input according to an embodiment of the present disclosure.

FIG. 8 is a drawing illustrating a method for generating a signal corresponding to release of a touch input depending on an area or pressure of a touch input according to an embodiment of the present disclosure.

Referring to FIGS. 6, 7, and 8, when a user touches a touch input device 603 or 803 using his or her finger 601 or 801, intensity of an area or pressure of the finger 601 or 801 which is in contact with the touch input device 603 or 803 may be fail to be equal. For example, when the user touches the touch input device 603 or 803 using the finger 601 or 801, touch information corresponding to a first area S1 (or first pressure P1) may be obtained at a time (e.g., a first time t1) when a touch input begins. Thereafter, during a predetermined time (e.g., from the first time t1 to a second time t2), the user may further press the touch input device 603 or 803 using the finger 601 or 803. This may vary according to a touching operation or habit of the user, but the user may further press a detection region of the touch input device 603 or 803 gradually using the finger 601 or 801 from a time when a touch input is recognized to any time. Thus, touch information corresponding to a second area S2 (or second pressure P2) may be obtained at the second time t2. Thereafter, assuming that the touch input is recognized, the user performs an operation of detaching the finger 601 or 801 from the touch input device 603 or 803. Thus, touch information corresponding to a third area S3 (or third pressure P3) which is smaller than the second area S2 (or second pressure P2) and a fourth area S4 (or fourth pressure P4) which is smaller than the third area S3 (or the third pressure P3) may be obtained at a third time t3 and a fourth time t4. Changes in an area of a touch input are shown in a first graph 701, and changes in pressure of the touch input are shown in a second graph 703. However, the changes in the area and pressure of the touch input, shown in the first graph 701 and the second graph 703, are not limited thereto.

According to an embodiment of the present disclosure, the touch input device 603 or 803 may generate a touch down event at a time (e.g., the first time t1) when a touch input begins and may generate a touch move event at intervals of a specified time after the first time t1. For example, the touch input device 603 or 803 may generate a touch move event at the second time t2, the third time t3, and the fourth time t4. Further, the touch input device 603 or 803 may generate a touch up event at a time (e.g., a fifth time t5) when the touch input is released. However, according to embodiments of the present disclosure, the touch input device 603 or 803 may predict release of the touch input before a time when the touch input is substantially released and may generate the touch up event in advance. For example, the touch input device 603 or 803 may generate the touch up event at a time (e.g., the third time t3 or the fourth time t4) when an area or pressure of the touch input is less than or equal to a specified size. Further, in this case, the touch input device 603 or 803 may fail to generate the touch up event at the fifth time t5 when the touch input is substantially released.

Figure 9:
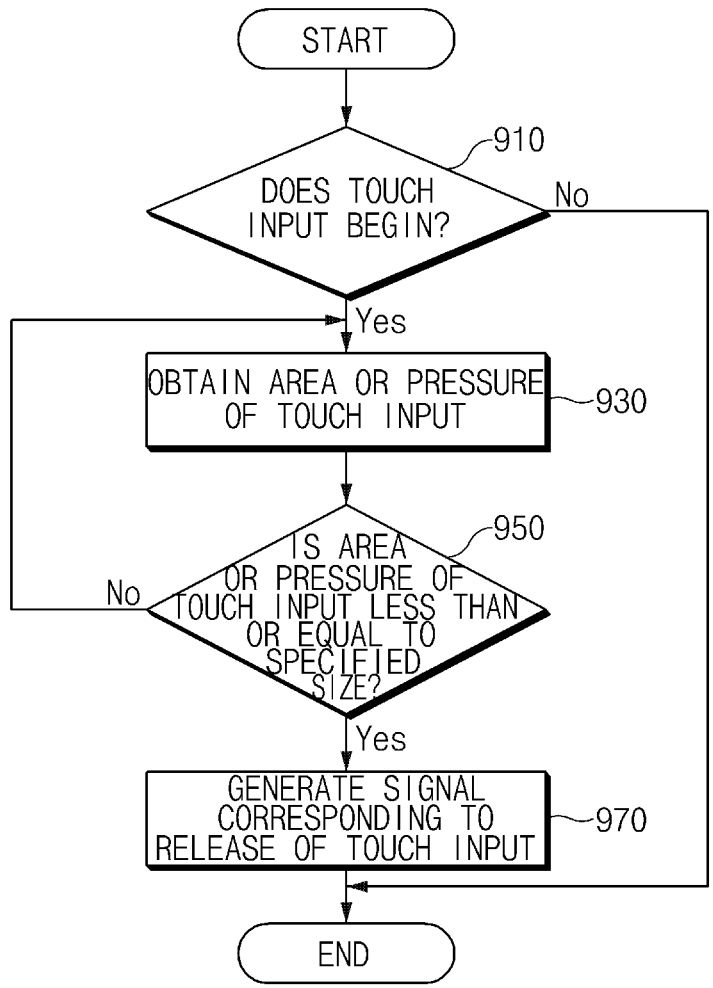
FIG. 9 is a flowchart illustrating an operation method of an electronic device associated with processing a touch input according to an embodiment of the present disclosure.

FIG. 9 is a flowchart illustrating an operation method of an electronic device associated with processing a touch input according to an embodiment of the present disclosure.

Referring to FIG. 9, in operation 910, an electronic device (e.g., an electronic device of FIG. 1) may determine whether a touch input begins. According to an embodiment of the present disclosure, the electronic device may determine whether the touch input begins based on a touch input device. For example, if detecting a change in a characteristic value of a specified size or more through the touch input device, the electronic device may determine that the touch begins. The characteristic value may be, for example, capacitance or the like.

In operation 930, the electronic device may obtain an area or pressure of the touch input. According to an embodiment of the present disclosure, after the touch input begins, the electronic device may obtain an area or pressure of the touch input at intervals of a specified time based on the touch input device.

In operation 950, the electronic device may determine whether the area or pressure of the touch input is less than or equal to a specified size. According to an embodiment of the present disclosure, the electronic device may determine whether the area or pressure of the touch input obtained based on the touch input device is less than or equal to the specified size. The specified size may correspond to, for example, a size of an area or pressure capable of being obtained immediately before the touch input is released. According to an embodiment of the present disclosure, the specified size may be set in a different way according to a type of the electronic device, a type of the touch input device, touch sensitivity of the touch input device, a type of a touch object, or the like. The specified size may be set based on, for example, data experimentally measured according to a type of the electronic device, a type of the touch input device, touch sensitivity of the touch input device, a type of a touch object, or the like.

If the area or pressure of the touch input is less than or equal to the specified size, in operation 970, the electronic device may generate a signal (e.g., a touch up event) corresponding to release of the touch input. If the touch up event is generated, the electronic device may perform a function, corresponding to the touch input, in advance before the touch input is substantially released. Thus, a speed for processing the touch input may be enhanced. Further, the electronic device may fail to generate the signal corresponding to release of the touch input at the time when the touch input is substantially released.

Figure 10:
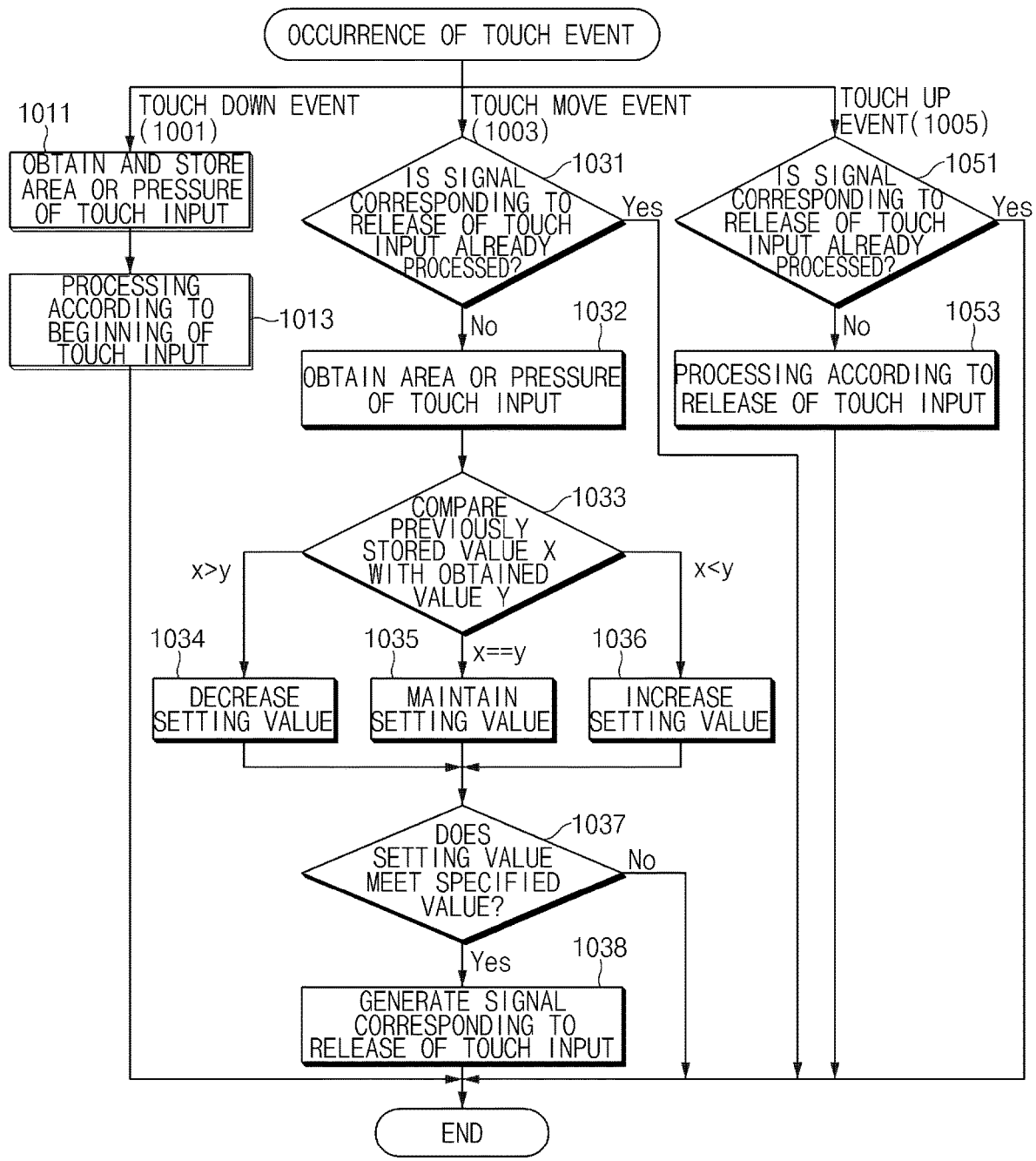
FIG. 10 is a flowchart illustrating an operation method of an electronic device according to a touch event according to an embodiment of the present disclosure.

FIG. 10 is a flowchart illustrating an operation method of an electronic device according to a touch event according to an embodiment of the present disclosure.

Referring to FIG. 10, an electronic device (e.g., an electronic device 100 of FIG. 1) may generate a touch event based on a touch input device. For example, the touch input device may generate a touch down event 1001 at a time when a touch input begins, may generate a touch up event

1005 at a time when the touch input is released, and may generate at least one touch move event 1003 at intervals of a specified time from the time when the touch input begins to the time when the touch input is released. The touch event may be a signal generated according to the touch event and may include touch information, such as a time, a location, an area, or strength (e.g., pressure) of the touch input.

According to an embodiment of the present disclosure, the touch input device may include a touch sensor (e.g., a touch sensor 550 of FIG. 5) for performing processing associated with an area upon a touch input and a pressure sensor (e.g., a pressure sensor 570 of FIG. 5) for performing processing associated with pressure upon the touch input. In some embodiments of the present disclosure, the pressure sensor may be provided to be independent of the touch sensor. In this case, pressure information detected by the pressure sensor may be transmitted together with another touch information (e.g., area information) detected by the touch sensor to a processor (e.g., a processor 510 of FIG. 5). Alternatively, the pressure information may be transmitted to the processor to be independent of the other touch information.

If the touch down event 1001 occurs, in operation 1011, the electronic device may obtain an area or pressure of the touch input. For example, the electronic device may obtain an area where a touch object is in contact with the touch input device or pressure applied to the touch input device at a time when the touch input begins. According to an embodiment of the present disclosure, if the touch input device includes touch information, such as an area or pressure of a touch input, in the touch down event 1001, the electronic device may extract the touch information from the touch down event 1001. Further, the electronic device may store the extracted touch information in its memory. Thereafter, in operation 1013, the electronic device may perform processing according to the beginning of the touch input. For example, the electronic device may transmit the touch down event 1001 to a related module. Receiving the touch down event 1001, the module may perform a specified function.

If the touch move event 1003 occurs, in operation 1031, the electronic device may determine whether to process a signal (e.g., the touch up event 1005) corresponding to release of the touch. If the touch up event 1005 is already generated and processed, the electronic device may fail to process the touch move event 1003. For example, the electronic device may disregard the touch move event 1003 generated after the touch up event 1005 is processed once. Further, if a touch prediction up event described below is already generated and processed, the electronic device may fail to process the touch move event 1003.

If the touch up event 1005 is not processed, in operation 1032, the electronic device may obtain an area or pressure of the touch input. According to an embodiment of the present disclosure, after the touch input begins, the electronic device may obtain an area or pressure of the touch input at intervals of a specified time based on the touch input device. For example, if the touch input device includes touch information, such as an area or pressure of a touch, in the touch move event 1003, the electronic device may extract the touch information from the touch move event 1003.

In operation 1033, the electronic device may compare a value x previously stored in the memory with an obtained value y. For example, the electronic device may compare an area or pressure of a touch input, stored in the memory, with an area or pressure of a touch input, obtained from the touch move event 1003.

If the previously stored value x is greater than the obtained value y, in operation 1034, the electronic device may decrease a setting value. If the previously stored value x is substantially the same as the obtained value y, in operation 1035, the electronic device may maintain the setting value. Further, if the previously stored value x is less than the obtained value y, in operation 1036, the electronic device may increase the setting value. The setting value may indicate the number of times that the area or pressure of the touch input is reduced. According to an embodiment of the present disclosure, the electronic device may initialize the setting value at a time when the touch input begins (e.g., a time when the touch down event 1001 occurs).

In operation 1037, the electronic device may determine whether the setting value meets a specified value (e.g., "0"). For example, the electronic device may determine whether the number of times that the area or pressure of the touch input is reduced meets the specified value.

If the setting value meets the specified value, in operation 1038, the electronic device may generate a signal (e.g., the touch up event 1005) corresponding to release of the touch input. Thus, the electronic device may perform processing according to release of the touch input in advance before the touch input is substantially released.

If the touch up event 1005 occurs, in operation 1051, the electronic device may determine whether the signal (e.g., the touch up event 1005) corresponding to the release of the touch input is already generated and processed. For example, the electronic device may determine whether the touch up event 1005 virtually generated when the touch move event 1003 is processed is already processed, rather than the touch up event 1005 generated after the touch input is substantially released. According to an embodiment of the present disclosure, the electronic device may define the virtual touch up event 1005 generated if the setting value meets the specified value as another event to be distinguished from the touch up event 1005 generated after the touch input is substantially released. For example, the electronic device may designate the virtual touch up event 1005 as a touch prediction up event. In this case, the electronic device may perform processing according to release of the touch input in response to the touch prediction up event and may fail to process the touch up event and the touch prediction up event which are generated subsequently.

If the touch up event 1005 is already generated and processed, the electronic device may fail to process the newly generated touch up event 1005. For example, the electronic device may disregard the touch move event 1003 generated after the touch up event 1005 is processed once.

If the touch up event 1005 is not processed, in operation 1053, the electronic device may perform processing according to release of the touch input.

According to an embodiment of the present disclosure, the above-mentioned operations may be performed by a processor included in the electronic device or may be performed in a touch input device included in the electronic device. Alternatively, some of the above-mentioned operations may be performed by the touch input device, and the other may be performed by the processor. For example, the touch input device may generate an event according to a touch input and may transmit the generated event to the processor. The processor may analyze the transmitted event and may perform a function corresponding to the event.

According to an embodiment of the present disclosure, the electronic device may use a specified condition value (e.g., a flag) in a process of processing the touch event. For example, the electronic device may use a flag to determine whether to generate the touch prediction up event. If the flag is set to a predetermined value (e.g., if a flag value is "1"), the electronic device may continue performing an operation for generating a signal corresponding to release of a touch input in advance (e.g., an operation for generating and processing the touch prediction up event). If the flag is released (e.g., if the flag value is "0"), the electronic device may end the operation for generating the signal corresponding to the release of the touch input in advance. According to an embodiment of the present disclosure, the electronic device may set the flag to a predetermined value when the touch down event 1001 occurs and may release the flag when the touch move event 1003 occurs by a flick, swipe, or scroll operation or when the touch up event 1005 occurs. Thus, the electronic device may end an operation of generating and processing the touch prediction up event when the flick, swipe, or scroll operation occurs.

Figure 11:
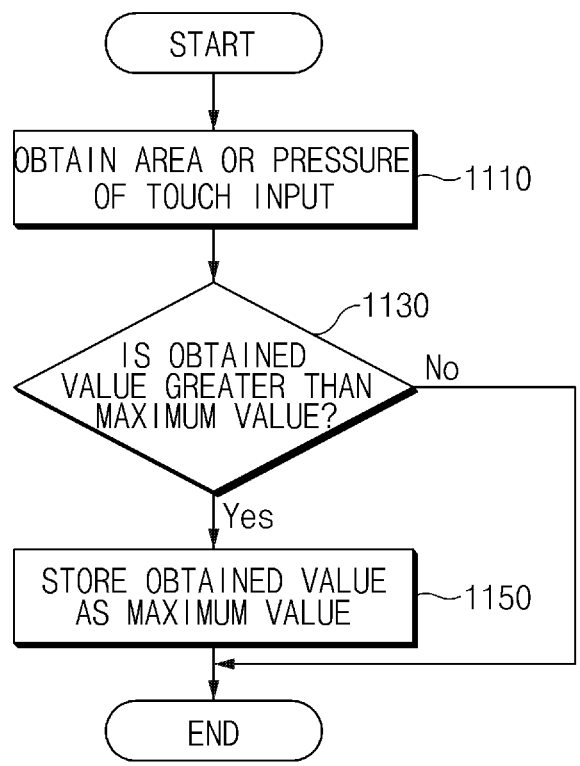
FIG. 11 is a flowchart illustrating a method for setting a reference value of an area or pressure of a touch input according to an embodiment of the present disclosure.

FIG. 11 is a flowchart illustrating a method for setting a reference value of an area or pressure of a touch input according to an embodiment of the present disclosure.

According to an embodiment of the present disclosure, an electronic device (e.g., an electronic device 100) may set a reference value for determining the number of times that an area or pressure of a touch input is reduced. For example, the reference value may be set to an area or pressure of a touch input measured at a time when the touch input begins. Alternatively, the reference value may be set to a maximum value of an area or pressure of the touch input. For example, when a user touches a touch input device 230 of FIG. 2 using his or her finger, an initial area or pressure of a touch input may be smaller than an area or pressure of a touch input after a predetermined time elapses. Thus, a touch control module 235 of FIG. 2 may more accurately predict release of the touch input by setting the maximum value of the area or pressure of the touch input to the reference value.

Referring to FIG. 11, in operation 1110, the electronic device may obtain an area or pressure of a touch input. For example, the electronic device may obtain the area or pressure of the touch input based on touch information included in a touch down event. For another example, the electronic device may obtain the area or pressure of the touch input based on touch information included in a touch move event.

In operation 1130, the electronic device may determine whether the obtained value is greater than a predetermined maximum value. According to an embodiment of the present disclosure, if the obtained value is greater than the maximum value, in operation 1150, the electronic device may correct the maximum value to the obtained value and may store the corrected value in its memory.

Figure 12:
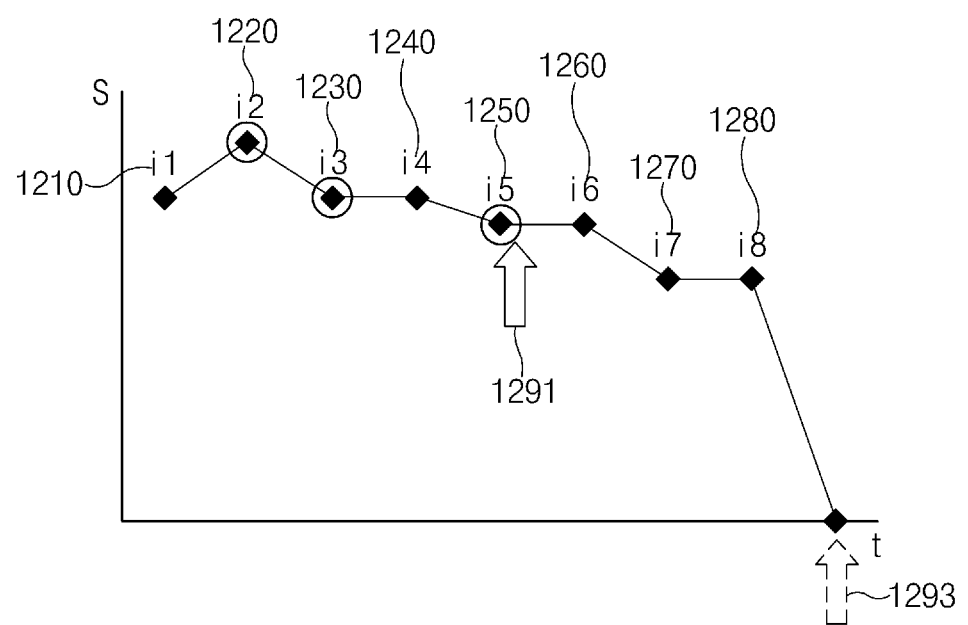
FIG. 12 is a drawing illustrating a method for generating a signal corresponding to release of a touch input with respect to a reference value of an area or pressure of the touch input according to an embodiment of the present disclosure.

FIG. 12 is a drawing illustrating a method for generating a signal corresponding to release of a touch input with respect to a reference value of an area or pressure of the touch input according to an embodiment of the present disclosure.

Referring to FIG. 12, an electronic device (e.g., an electronic device 100 of FIG. 1) may generate a signal (e.g., a touch up event) corresponding to release of a touch input with respect to a reference value of an area or pressure of the touch input.

According to an embodiment of the present disclosure, the electronic device may set the reference value of the area or pressure of the touch input to an area or pressure of a touch input obtained at a time when the touch input begins. For example, the electronic device may set an area or pressure of a touch input, extracted from a touch down event i1 1210, to the reference value. Further, the electronic device may set the number of times (e.g., a setting value) that an area or pressure of the touch input for generating the signal corresponding to release of the touch input is reduced. If the setting value is set to two times, for example, if the number of times that the area or pressure of the touch input is reduced is generated two times such that the area or pressure of the touch input is less than the reference value, the electronic device may generate the signal corresponding to the release of the touch input.

According to an embodiment of the present disclosure, if an area or pressure of a touch input obtained after the touch input begins is greater than the reference value, the electronic device may correct (or replace) the reference value to (or with) the area or pressure of the obtained touch input. For example, as shown, if an area or pressure of a touch input obtained from a first touch move event i2 1220 is greater than the reference value, the electronic device may correct the reference value to the area or pressure of the touch input obtained from the first touch move event i2 1220.

Further, if an area or pressure of a touch input obtained from a touch move event subsequently obtained is less than the reference value and is more reduced than a previous value, the electronic device may reduce the setting value. If the area or pressure of the touch input is less than the reference value and is substantially the same as the previous value, the electronic device may maintain the setting value. For example, as shown, in a state where the setting value is set to two times, if an area or pressure of a touch input obtained from a second touch move event i3 1230 is less than the reference value and is more reduced than the area or pressure of the touch input obtained from the first touch move event i2 1220, the electronic device may reduce the setting value to one time. If an area or pressure of a touch input obtained from a third touch move event i4 1240 is less than the reference value and is substantially the same as the area or pressure of the touch input obtained from the second touch move event i3 1230, the electronic device may maintain the setting value once without change. Further, if an area or pressure of a touch input obtained from a fourth touch move event i5 1250 is less than the reference value and is more reduced than the area or pressure of the touch input obtained from the third touch move event i4 1240, the electronic device may reduce the setting value to "0".

If the setting value meets a specified value, for example, if the setting value is reduced to "0", the electronic device may generate a signal (e.g., a first touch up event 1291) corresponding to release of the touch input. Further, the electronic device may disregard a fifth touch move event i6 1260, a sixth touch move event i7 1270, and a seventh touch move event i8 1280, which are subsequently generated and may disregard a second touch up event 1293 generated after the touch input is substantially released. Alternatively, if the touch input is substantially released, the electronic device may fail to generate the second touch up event 1293.

Figure 13:
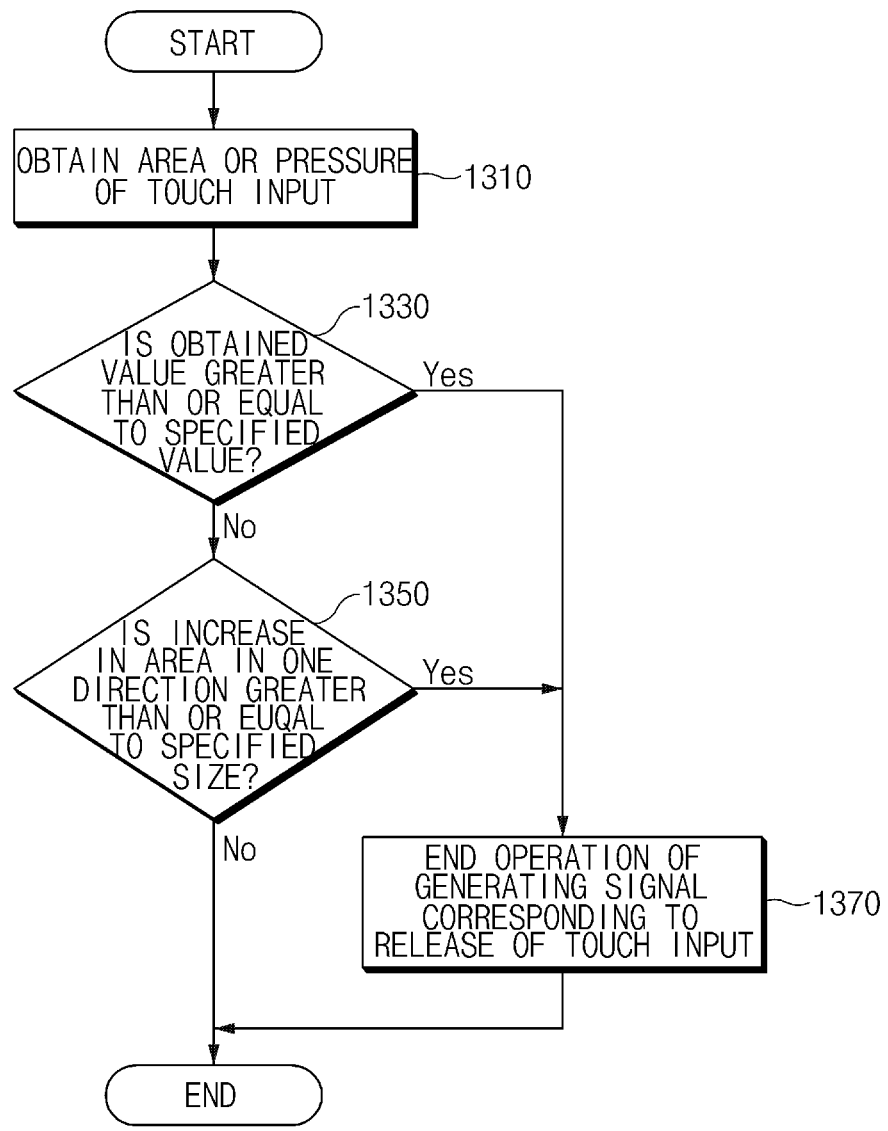
FIG. 13 is a flowchart illustrating a state where a signal corresponding to release of a touch input is not generated according to an embodiment of the present disclosure.

FIG. 13 is a flowchart illustrating a state where a signal corresponding to release of a touch input is not generated according to an embodiment of the present disclosure.

Referring to FIG. 13, an electronic device (e.g., an electronic device 100 of FIG. 1) may determine to perform a series of operations for predicting release of a touch input depending on a type of the touch input. For example, if the touch input is a short press touch input, such as a tap input, the electronic device may predict release of the touch input. In case of the short press touch input, since only information about an initial location of the touch input is simply used as important information, a plurality of touch move events before a touch up even is transmitted may be unnecessary information. Thus, if the touch input is determined as the short press touch input, the electronic device may predict release of the touch input and may generate a touch up event.

For another example, in case of a multi-touch input, the electronic device may predict release of each of a plurality of touch inputs including the multi-touch input. For example, each of the plurality of touch inputs including the multi-touch input may be processed to be the same as the short press touch input. Thus, the electronic device may predict release of each of the plurality of touch inputs including the multi-touch input and may generate a signal corresponding to release of the multi-touch input at a time when all the touch inputs are released.

For another example, in case of a long press touch input, such as a drag, the electronic device may fail to predict release of the touch input. Since the long press touch input varies in time according to intention of the user, it may be difficult to predict release of the long press touch input. Further, although release of the long press touch input is predicted, since there are a large number of touch move events generated from a time when the long press touch input begins to a time when the long press touch input is released, the effect of disregarding some of the touch move events may be small.

For another example, in case of a touch input, such as flick or swipe, in which a touch point is moved, the electronic device may fail to predict release of the touch input. In this case, similarly, since the touch input varies in time according to intention of the user, it may be difficult to predict release of the touch input.

In operation 1310, the electronic device for performing the above-mentioned function may obtain an area or pressure of a touch input. According to an embodiment of the present disclosure, after the touch input begins, the electronic device may obtain the area or pressure of the touch input at intervals of a specified time based on a touch input device. For example, the electronic device may extract an area or pressure of a touch input from a touch move event generated at intervals of the specified time.

In operation 1330, the electronic device may determine whether the obtained area or pressure of the touch input is greater than or equal to a specified value. The specified value may correspond to, for example, an area or pressure of a touch input capable of being obtained, upon a short press touch input. For example, the specified value may vary according to intention of the user and touch habit of the user. However, in general, the user may touch the touch input device using a touch object with smaller force upon a short press touch input than a long press touch input. As a result, an area or pressure of a touch input obtained upon the short press touch input may be relatively smaller than an area or pressure of a touch input obtained upon the long press touch input. Thus, it is preferable than the specified value is set to a value capable of classifying the short press touch input and the long press touch input. The specified value may be set based on, for example, data experimentally measured according to intention of the user and touch habit of the user.

If the obtained area or pressure of the touch input is greater than or equal to the specified value, in operation 1370, the electronic device may end an operation for previously generating a signal corresponding to release of the touch input. For example, the electronic device may fail to predict release of a touch input with respect to a corresponding user touch (e.g., a user touch of one round, connected to a touch down event, a touch move event, and a touch up event).

In operation 1350, the electronic device may determine whether an increase in area in one direction of the touch input is greater than or equal to a specified size. If the touch input increases to an area of the specified size or more, the electronic device may determine that the touch input is a touch input, such as flick or swipe, in which a touch point is moved. According to an embodiment of the present disclosure, if a region formed by coordinates corresponding to the touch input is moved or widened in one direction, the electronic device may determine that the touch input is a touch input in which a touch point is moved. In this case, the electronic device may perform operation 1370. For example, the electronic device may fail to predict release of a touch input with respect to a corresponding user touch.

As described above, according to various embodiments of the present disclosure, a touch input processing method of an electronic device may include obtaining touch information about a first touch input at least once after a first time when the first touch input begins to a second time when the first touch input is released, obtaining at least one of an area of the first touch input or a pressure of the first touch input based on the obtained touch information, and executing a function corresponding to release of the first touch input if the at least one of the area of the first touch input or the pressure of the first touch input meets a specified condition.

According to various embodiments of the present disclosure, the method may further include disregarding the touch information about the first touch input after executing the function corresponding to the release of the first touch input.

According to various embodiments of the present disclosure, the method may further include determining that the specified condition is met if the at least one of the area of the first touch input or the pressure of the first touch input is less than or equal to a first size.

According to various embodiments of the present disclosure, the method may further include determining that the specified condition is met if the at least one of the area of the first touch input or the pressure of the first touch input is less than or equal to a first size and is reduced a specified number of times.

Figure 14:
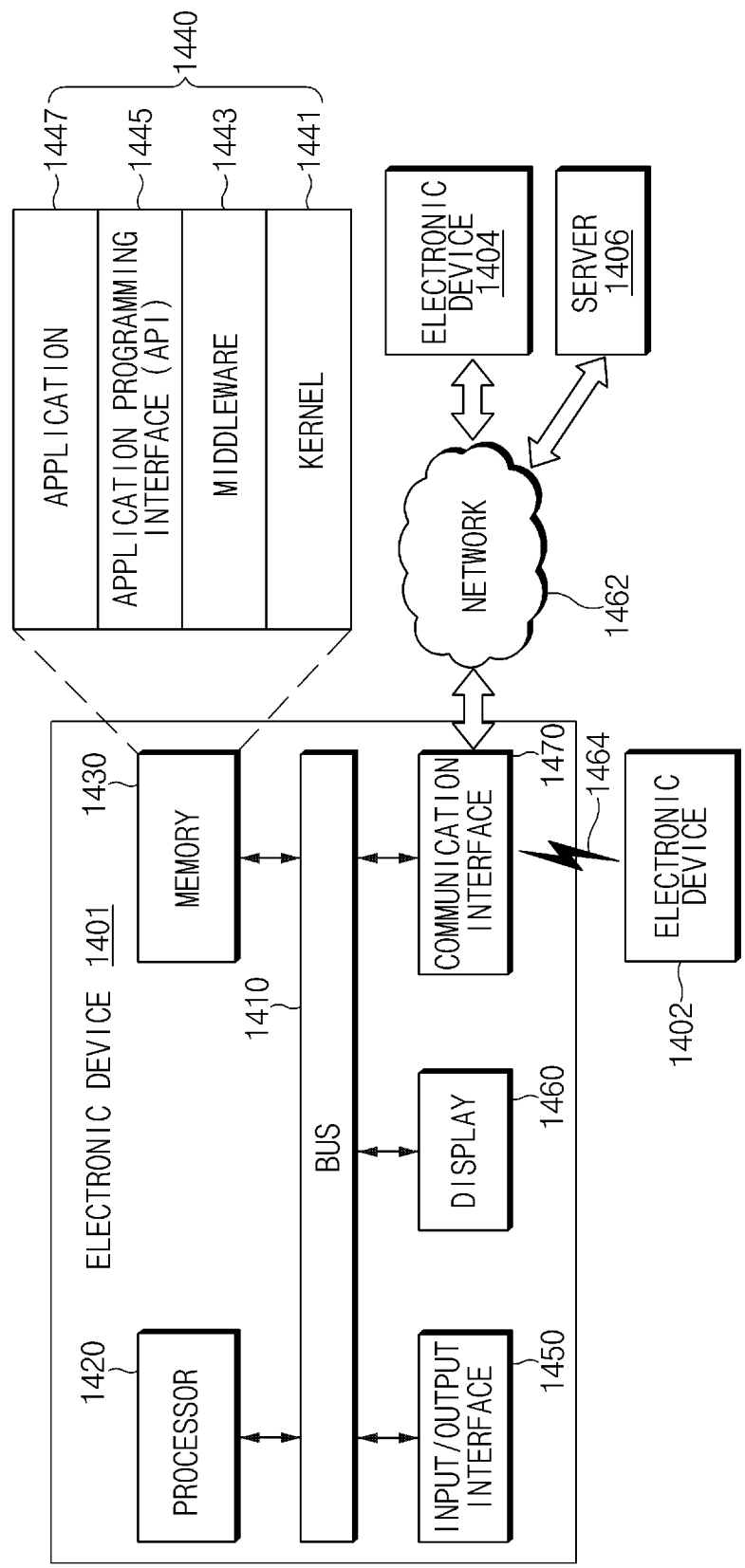
FIG. 14 is a block diagram illustrating an electronic device in a network environment according to an embodiment of the present disclosure.

FIG. 14 is a block diagram illustrating an electronic device in a network environment according to an embodiment of the present disclosure.

Referring to FIG. 14, an electronic device 1401 may include a bus 1410, a processor 1420, a memory 1430, an input/output interface 1450, a display 1460, and a communication interface 1470. According to an embodiment of the present disclosure, the electronic device 1401 may not include at least one of the elements or may further include other element(s). The bus 1410 may interconnect the elements 1420 to 1470 and may include a circuit for conveying communications (e.g., a control message or data) among the elements.

The processor 1420 may include one or more of a CPU, an AP, or a CP. For example, the processor 1420 may perform an arithmetic operation or data processing associated with control and/or communication of at least one other elements of the electronic device 1401.

The memory 1430 may include a volatile and/or nonvolatile memory. For example, the memory 1430 may store instructions or data associated with at least one other element(s) of the electronic device 1401. According to an embodiment of the present disclosure, the memory 1430 may store software and/or a program 1440. The program 1440 may include, for example, a kernel 1441, a middleware 1443, an application programming interface (API) 1445, and/or an application program (or "an application") 1447. At least a part of the kernel 1441, the middleware 1443, or the API 1445 may be referred to as an "OS".

For example, the kernel 1441 may control or manage system resources (e.g., the bus 1410, the processor 1420, the memory 1430, and the like) that are used to execute operations or functions implemented in other programs (e.g., the middleware 1443, the API 1445, and the application program 1447). Furthermore, the kernel 1441 may provide an interface that allows the middleware 1443, the API 1445, or the application program 1447 to access discrete elements of the electronic device 1401 so as to control or manage system resources.

The middleware 1443 may perform, for example, a mediation role such that the API 1445 or the application program 1447 communicates with the kernel 1441 to exchange data. Furthermore, the middleware 1443 may process one or more task requests received from the application program 1447 according to a priority. For example, the middleware 1443 may assign the priority, which makes it possible to use a system resource (e.g., the bus 1410, the processor 1420, the memory 1430, or the like) of the electronic device 1401, to at least one of the application program 1447 and may process the one or more task requests.

The API 1445 may be, for example, an interface through which the application program 1447 controls a function provided by the kernel 1441 or the middleware 1443, and may include, for example, at least one interface or function (e.g., an instruction) for a file control, a window control, image processing, a character control, or the like.

The input/output interface 1450 may transmit, for example, an instruction or data, input from a user or another external device, to other element(s) of the electronic device 1401 or may output an instruction or data, received from other element(s) of the electronic device 1401, to a user or another external device.

The display 1460 may include, for example, a liquid crystal display (LCD), a light-emitting diode (LED) display, an organic LED (OLED) display, a microelectromechanical systems (MEMS) display, or an electronic paper display. The display 1460 may display, for example, various contents (e.g., a text, an image, a video, an icon, a symbol, and the like) to a user. The display 1460 may include a touch screen and may receive, for example, a touch, gesture, proximity, or hovering input using an electronic pen or a part of a user's body.

For example, the communication interface 1470 may establish communication between the electronic device 1401 and an external device (e.g., the first electronic device 1402, the second electronic device 1404, or the server 1406). For example, the communication interface 1470 may be connected to the network 1462 over wireless communication 1464 or wired communication to communicate with the external device (e.g., the second electronic device 1404 or the server 1406).

The wireless communication may include, for example, cellular communication which uses at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, the wireless communication may include at least one of wireless fidelity (Wi-Fi), light fidelity (Li-Fi), Bluetooth (BT), BT low energy (BLE), ZigBee, near field communication (NFC), magnetic secure transmission (MST), radio frequency (RF), or a body area network (BAN). According to an embodiment of the present disclosure, the wireless communication may include a GNSS. The GNSS may be, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1462 may include at least one of telecommunications networks, for example, a computer network (e.g., local area network (LAN) or wide area network (WAN)), an Internet, or a telephone network.

Each of the first and second electronic devices 1402 and 1404 may be a device of which the type is different from or the same as that of the electronic device 1401. According to various embodiments of the present disclosure, all or a portion of operations that the electronic device 1401 will perform may be executed by another or plural electronic devices (e.g., the first electronic device 1402, the second electronic device 1404 or the server 1406). According to an embodiment of the present disclosure, in the case where the electronic device 1401 executes any function or service automatically or in response to a request, the electronic device 1401 may not perform the function or the service internally, but, alternatively or additionally, it may request at least a portion of a function associated with the electronic device 1401 at other electronic device (e.g., the electronic device 1402 or 1404 or the server 1406). The other electronic device may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

Figure 15:
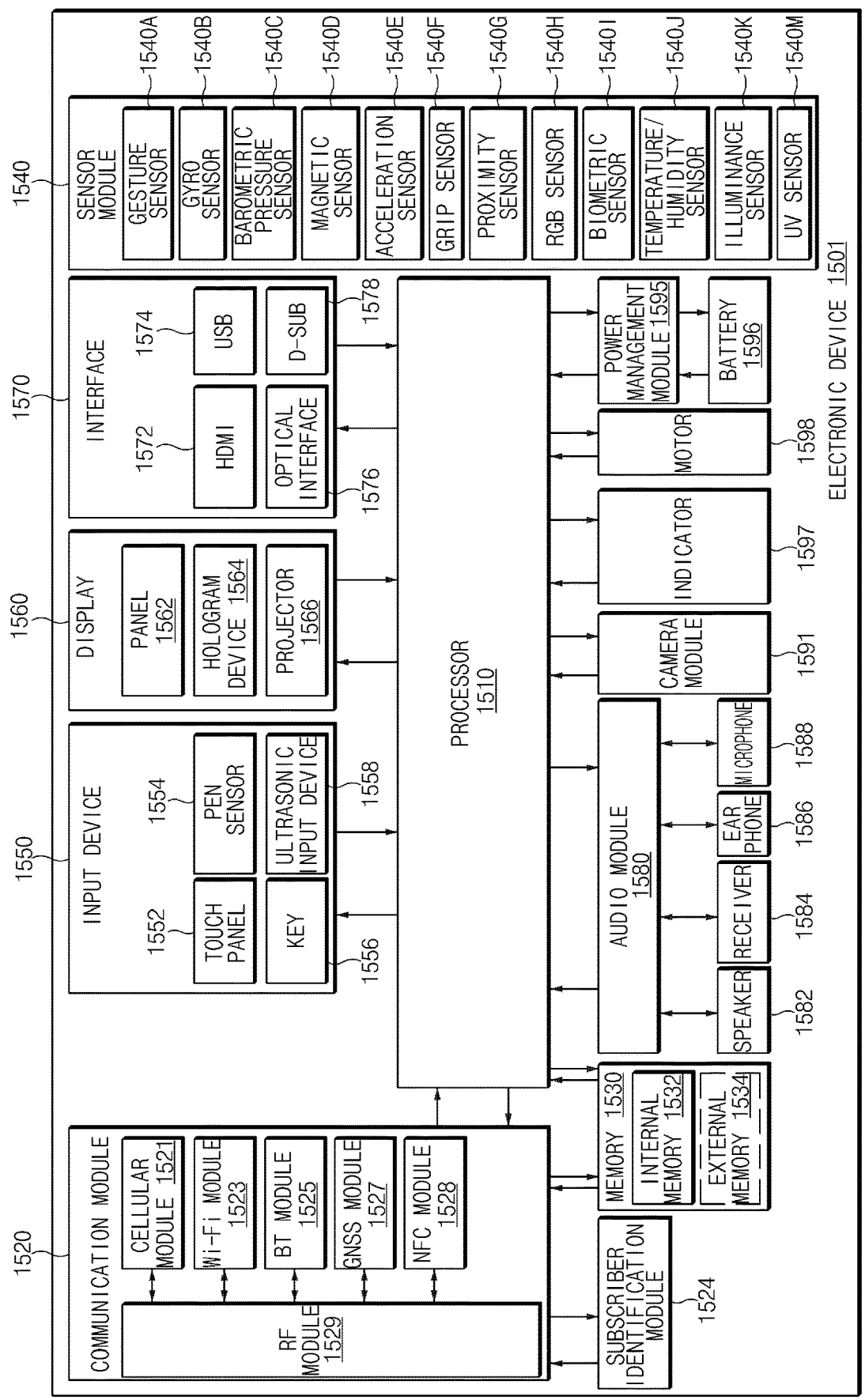
FIG. 15 is a block diagram illustrating an electronic device according to one embodiment of the present disclosure.

FIG. 15 is a block diagram illustrating an electronic device according to one embodiment of the present disclosure.

Referring to FIG. 15, an electronic device 1501 may include, for example, all or a part of the electronic device 100 illustrated in FIG. 1 or the electronic device 1401 illustrated in FIG. 14. The electronic device 1501 may include one or more processors (e.g., an AP) 1510, a communication module 1520, a subscriber identification module 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may drive, for example, an OS or an application to control a plurality of hardware or software elements connected to the processor 1510 and may process and compute a variety of data. For example, the processor 1510 may be implemented with an SoC. According to an embodiment of the present disclosure, the processor 1510 may further include a graphic processing unit (GPU) and/or an image signal processor. The processor 1510 may include at least a part (e.g., a cellular module 1521) of the elements illustrated in FIG. 15. The processor 1510 may load an instruction or data, which is received from at least one of other elements (e.g., a nonvolatile memory), into a volatile memory and process the loaded instruction or data. The processor 1510 may store result data in the nonvolatile memory.

The communication module 1520 may be configured the same as or similar to the communication interface 1470 of FIG. 14. The communication module 1520 may include the cellular module 1521, a Wi-Fi module 1523, a BT module 1525, a GNSS module 1527, a NFC module 1528, and a RF module 1529.

The cellular module 1521 may provide, for example, voice communication, video communication, a character service, an Internet service, or the like over a communication network. According to an embodiment of the present disclosure, the cellular module 1521 may perform discrimination and authentication of the electronic device 1501 within a communication network by using the subscriber identification module (e.g., a subscriber identification module (SIM) card) 1524. According to an embodiment of the present disclosure, the cellular module 1521 may perform at least a portion of functions that the processor 1510 provides. According to an embodiment of the present disclosure, the cellular module 1521 may include a CP. In some embodiments of the present disclosure, at least some (e.g., two or more) of the cellular module 1521, the Wi-Fi module 1523, the BT module 1525, the GNSS module 1527, or the NFC module 1528 may be included within one IC or an IC package.

For example, the RF module 1529 may transmit and receive a communication signal (e.g., an RF signal). For example, the RF module 1529 may include a transceiver, a power amplifier module (PAM), a frequency filter, a low noise amplifier (LNA), an antenna, or the like. According to another embodiment of the present disclosure, at least one of the cellular module 1521, the Wi-Fi module 1523, the BT module 1525, the GNSS module 1527, or the NFC module 1528 may transmit and receive an RF signal through a separate RF module.

The subscriber identification module 1524 may include, for example, a card and/or embedded SIM that includes a subscriber identification module and may include unique identify information (e.g., IC card identifier (ICCID)) or subscriber information (e.g., international mobile subscriber identity (IMSI)).

The memory 1530 (e.g., the memory 1430 of FIG. 14) may include an internal memory 1532 or an external memory 1534. For example, the internal memory 1532 may include at least one of, for example, a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 1534 may include a flash drive, such as compact flash (CF), secure digital (SD), micro SD (Micro-SD), mini SD (Mini-SD), extreme digital (xD), a multimedia card (MMC), a memory stick, or the like. The external memory 1534 may be operatively and/or physically connected to the electronic device 1501 through various interfaces.

The sensor module 1540 may measure, for example, a physical quantity or may detect an operation state of the electronic device 1501. The sensor module 1540 may convert the measured or detected information to an electric signal. For example, the sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, the proximity sensor 1540G, a color sensor 1540H (e.g., red, green, blue (RGB) sensor), a biometric sensor 1540I, a temperature/humidity sensor 1540J, an illuminance sensor 1540K, or an ultraviolet (UV) sensor 1540M. Although not illustrated, additionally or alternatively, the sensor module 1540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. According to an embodiment of the present disclosure, the electronic device 1501 may further include a processor that is a part of the processor 1510 or independent of the processor 1510 and is configured to control the sensor module 1540. The processor may control the sensor module 1540 while the processor 1510 remains at a sleep state.

The input device 1550 may include, for example, a touch panel 1552, a (digital) pen sensor 1554, a key 1556, or an ultrasonic input device 1558. For example, the touch panel 1552 may use at least one of capacitive, resistive, infrared and ultrasonic detecting methods. In addition, the touch panel 1552 may further include a control circuit. The touch panel 1552 may further include a tactile layer to provide a tactile reaction to a user. The (digital) pen sensor 1554 may be, for example, a part of a touch panel or may include an additional sheet for recognition. The key 1556 may include, for example, a physical button, an optical key, or a keypad. The ultrasonic input device 1558 may detect (or detect) an ultrasonic signal, which is generated from an input device, through a microphone (e.g., a microphone 1588) and may determine data corresponding to the detected ultrasonic signal.

The display 1560 (e.g., a display 1460 of FIG. 14) may include a panel 1562, a hologram device 1564, a projector 1566, and/or a control circuit for controlling the panel 1562, the hologram device 1564, or the projector 1566. The panel 1562 may be implemented, for example, to be flexible, transparent or wearable. The panel 1562 and the touch panel 1552 may be integrated into a single module. According to an embodiment of the present disclosure, the panel 1562 may include a pressure sensor (or force sensor) that measures the intensity of touch pressure by a user. The pressure sensor may be implemented integrally with the touch panel 1552, or may be implemented as at least one sensor separately from the touch panel 1552. The hologram device 1564 may display a stereoscopic image in a space using a light interference phenomenon. The projector 1566 may project light onto a screen so as to display an image. For example, the screen may be arranged in the inside or the outside of the electronic device 1501.

The interface 1570 may include, for example, an HDMI 1572, a USB 1574, an optical interface 1576, or a D-subminiature (D-sub) 1578. The interface 1570 may be included, for example, in a communication interface 1470 illustrated in FIG. 14. Additionally or generally, the interface 1570 may include, for example, a mobile high definition link (MHL) interface, a secure digital (SD) card/multi-media card (MMC) interface, or an infrared data association (IrDA) standard interface.

The audio module 1580 may convert, for example, a sound and an electric signal in dual directions. At least a part of the audio module 1580 may be included, for example, in an input/output interface 1450 illustrated in FIG. 14. The audio module 1580 may process, for example, sound information that is input or output through a speaker 1582, a receiver 1584, an earphone 1586, or the microphone 1588.

For example, the camera module 1591 may capture a still image or a video. According to an embodiment of the present disclosure, the camera module 1591 may include at least one or more image sensors (e.g., a front sensor or a rear sensor), a lens, an image signal processor (ISP), or a flash (e.g., an LED or a xenon lamp).

The power management module 1595 may manage, for example, power of the electronic device 1501. According to an embodiment of the present disclosure, a power management IC (PMIC), a charger IC, or a battery or fuel gauge may be included in the power management module 1595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, and the like. The motor 1598 may convert an electrical signal into a mechanical vibration and may generate the following effects: vibration, haptic, and the like.

The electronic device 1501 may include, for example, a mobile TV supporting device (e.g., a GPU) capable of processing media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments of the present disclosure, the electronic device (e.g., the electronic device 1501) may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 16:
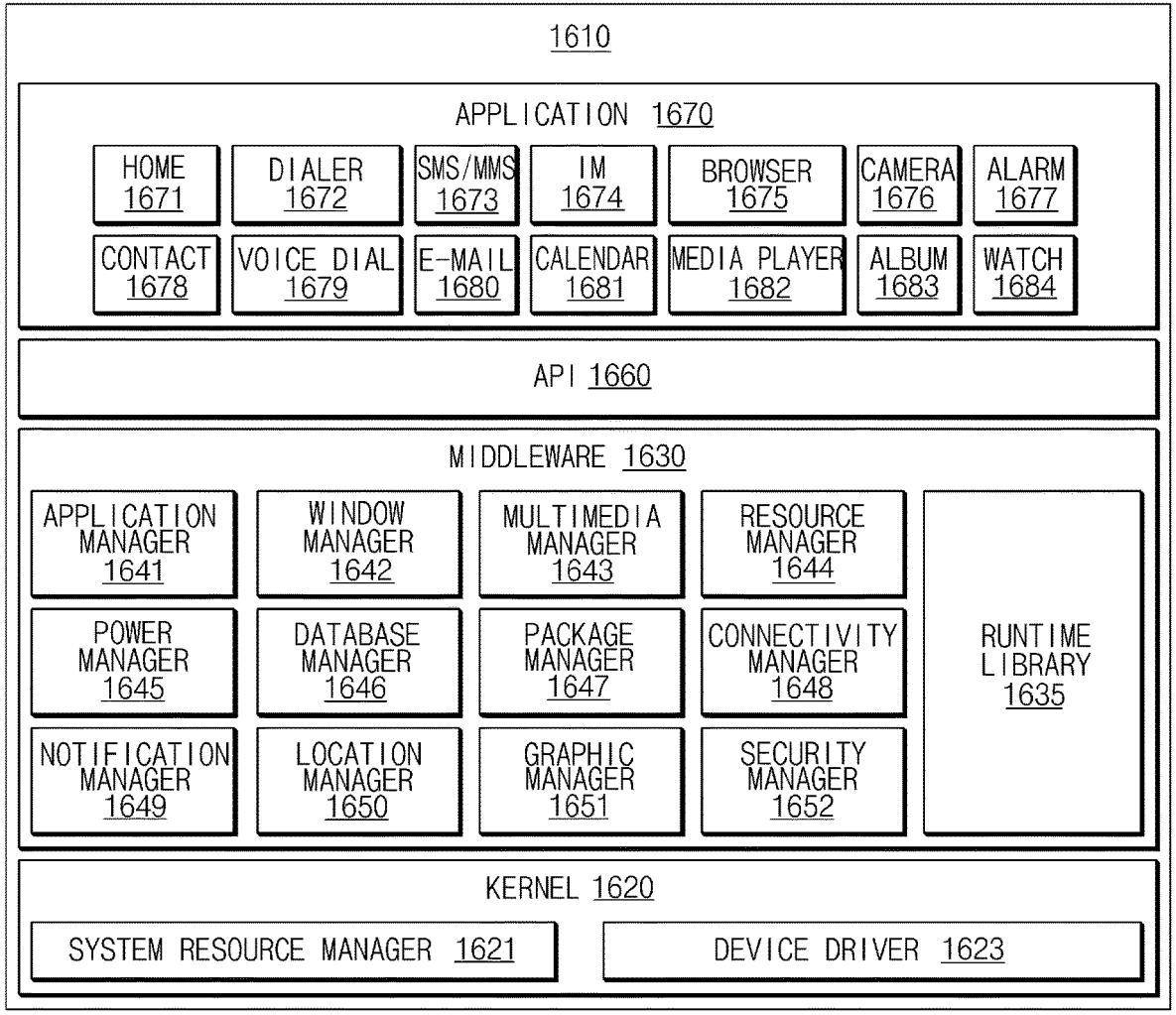
FIG. 16 is a block diagram illustrating a program module according to an embodiment of the present disclosure.

FIG. 16 is a block diagram illustrating a program module according to an embodiment of the present disclosure.

Referring to FIG. 16, according to an embodiment of the present disclosure, a program module 1610 (e.g., a program 1440 of FIG. 14) may include an OS to control resources associated with an electronic device (e.g., an electronic device 1401 of FIG. 14), and/or diverse applications (e.g., an application program 1447 of FIG. 14) driven on the OS. The OS may be, for example, Android™, iOS™, Windows™, Symbian™, Tizen™, or Bada™.

The program module 1610 may include a kernel 1620 (e.g., a kernel 1441 of FIG. 14), a middleware 1630 (e.g., a middleware 1443 of FIG. 14), an application programming interface (API) 1660 (e.g., an API 1445 of FIG. 14), and/or an application 1670 (e.g., an application program 1447 of FIG. 14). At least a portion of the program module 1610 may be preloaded on an electronic device or may be downloadable from an external electronic device (e.g., a first electronic device 1402, a second electronic device 1404, a server 1406, or the like of FIG. 14).

The kernel 1620 may include, for example, a system resource manager 1621 or a device driver 1623. The system resource manager 1621 may control, allocate, or retrieve system resources. According to an embodiment of the present disclosure, the system resource manager 1621 may include a process managing unit, a memory managing unit, a file system managing unit, or the like. The device driver 1623 may include, for example, a display driver, a camera driver, a BT driver, a shared memory driver, a USB driver, a keypad driver, a Wi-Fi driver, an audio driver, or an inter-process communication (IPC) driver.

The middleware 1630 may provide, for example, a function that the application 1670 needs in common, or may provide diverse functions to the application 1670 through the API 1660 to allow the application 1670 to efficiently use limited system resources of the electronic device. According to an embodiment of the present disclosure, the middleware 1630 may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, or a security manager 1652.

The runtime library 1635 may include, for example, a library module that is used by a compiler to add a new function through a programming language while the application 1670 is being executed. The runtime library 1635 may perform input/output management, memory management, or capacities about arithmetic functions.

The application manager 1641 may manage, for example, a life cycle of at least one application of the application 1670. The window manager 1642 may manage a graphic user interface (GUI) resource that is used in a screen. The multimedia manager 1643 may identify a format necessary for playing diverse media files, and may perform encoding or decoding of media files by using a codec suitable for the format. The resource manager 1644 may manage resources, such as a storage space, memory, or source code of at least one application of the application 1670.

The power manager 1645 may operate, for example, with a basic input/output system (BIOS) to manage a battery or power, and may provide power information for an operation of an electronic device. The database manager 1646 may generate, search for, or modify database that is to be used in at least one application of the application 1670. The package manager 1647 may install or update an application that is distributed in the form of package file. The connectivity manager 1648 may manage, for example, wireless connection.

The notification manager 1649 may display or notify an event, such as arrival message, appointment, or proximity notification in a mode that does not disturb a user. The location manager 1650 may manage location information about an electronic device. The graphic manager 1651 may manage a graphic effect that is provided to a user, or manage a user interface relevant thereto. The security manager 1652 may provide a general security function necessary for system security, user authentication, or the like.

According to an embodiment of the present disclosure, the middleware 1630 may include a telephony manager for managing a voice or video call function of the electronic device or a middleware module that combines diverse functions of the above-described elements. According to an embodiment of the present disclosure, the middleware 1630 may provide a module specialized to each OS kind to provide differentiated functions. Additionally, the middleware 1630 may dynamically remove a part of the preexisting elements or may add new elements thereto.

The API 1660 may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 1670 may include, for example, applications, such as a home application 1671, a dialer application 1672, a short message service (SMS)/multimedia messaging service (MMS) application 1673, an instant message (IM) application 1674, a browser application 1675, a camera application 1676, an alarm application 1677, a contact application 1678, a voice dial application 1679, an e-mail application 1680, a calendar application 1681, a media player application 1682, an album application 1683, a watch application 1684, health care (e.g., measuring an exercise quantity, blood sugar, or the like) or offering of environment information (e.g., information of barometric pressure, humidity, temperature, or the like).

According to an embodiment of the present disclosure, the application 1670 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device.

According to an embodiment of the present disclosure, the application 1670 may include an application (e.g., a health care application of a mobile medical device) that is assigned in accordance with an attribute of an external electronic device. According to an embodiment of the present disclosure, the application 1670 may include an application that is received from an external electronic device.

At least a portion of the program module 1610 may be implemented by software, firmware, hardware (e.g., the processor 1510), or a combination (e.g., execution) of two or more thereof, and may include modules, programs, routines, sets of instructions, processes, or the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1420), the processor may perform functions corresponding to the instructions. The computer-readable storage medium may be, for example, the memory 1430.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touch input device;
a touch control circuit configured to generate touch information about a touch input detected by the touch input device;
at least one processor configured to be electrically connected with the touch input device and the touch control circuit; and
a memory configured to be electrically connected with the at least one processor,
wherein the memory is further configured to store instructions that, when executed, cause the at least one processor to:
obtain touch information about a first touch input at least once from the touch control circuit after a first time when the first touch input begins to a second time when the first touch input is released,
obtain at least one of an area of the first touch input or a pressure of the first touch input based on the obtained touch information,
execute a function corresponding to release of the first touch input when the at least one of the area of the first touch input or the pressure of the first touch input meets a specified condition, and
determine that the specified condition is met when the at least one of the area of the first touch input or the pressure of the first touch input is less than or equal to a first size and is reduced a specified number of times.

2. The electronic device of claim 1, wherein, when the function corresponding to the release of the first touch input is executed,
the touch control circuit ceases to transmit the touch information about the first touch input to the at least one processor, or
the at least one processor disregards the touch information about the first touch input obtained from the touch control circuit.

3. The electronic device of claim 1, wherein the memory is further configured to store instructions that, when executed, cause the at least one processor to determine that the specified condition is met when the at least one of the area of the first touch input or the pressure of the first touch input is less than or equal to a first size.

4. The electronic device of claim 1, wherein the memory is further configured to store instructions that, when executed, cause the at least one processor to execute a function corresponding to release of a multi-touch input where a second touch input begins within a specified time after the first touch input begins when the at least one of the area of the first touch input or the pressure of the first touch input meets the specified condition and at least one of an area of the second touch input or a pressure of the second touch input meets the specified condition.

5. The electronic device of claim 1,
wherein the memory is further configured to store instructions that, when executed, cause the at least one processor to:
determine a change in a region formed by touch coordinates of the first touch input based on a first touch information obtained at a third time between the first time and the second time and a second touch information obtained at a fourth time which is between the first time and the second time and is before the third time, and
determine that the specified condition is not met when the region is moved or widened in one direction, although the at least one of the area of the first touch input or the pressure of the first touch input is less than or equal to a first size, and
wherein the at least one of the area of the first touch input or the pressure of the first touch input is obtained at a fifth time which is between the first time and the second time and is after the third time.

6. The electronic device of claim 1, wherein the touch input device comprises at least one of:
a touch panel configured to detect contact or proximity of a touch object; or
a pressure sensor configured to detect pressure applied by the touch object.

7. An electronic device comprising:
a touch input device;
a touch control circuit; and
at least one processor configured to be electrically connected with the touch input device and the touch control circuit,
wherein the touch control circuit is configured to:
generate touch information about a first touch input at least once, the first touch input detected by the touch input device after a first time when the first touch input begins to a second time when the first touch input is released,
obtain at least one of an area of the first touch input or a pressure of the first touch input based on the generated touch information,
generate a release signal corresponding to release of the first touch input if the at least one of the area of the first touch input or the pressure of the first touch input meets a specified condition,
transmit the release signal to the at least one processor when the release signal is generated, and
determine that the specified condition is met when the at least one of the area of the first touch input or the pressure of the first touch input is less than or equal to a first size and is reduced a specified number of times.

8. The electronic device of claim 7, wherein the touch control circuit is further configured to disregard the first touch input detected by the touch input device after generating the release signal.

9. The electronic device of claim 7, wherein the touch control circuit is further configured to determine that the specified condition is met when the at least one of the area of the first touch input or the pressure of the first touch input is less than or equal to a first size.

10. The electronic device of claim 7, wherein the touch control circuit is further configured to generate a release signal corresponding to release of a multi-touch input where a second touch input begins within a specified time after the first touch input begins when the at least one of the area of the first touch input or the pressure of the first touch input meets the specified condition and at least one of an area of the second touch input or a pressure of the second touch input meets the specified condition.

11. The electronic device of claim 7,
wherein the touch control circuit is further configured to:
determine a change in a region formed by touch coordinates of the first touch input based on a first touch information obtained at a third time between the first time and the second time and a second touch information obtained at a fourth time which is between the first time and the second time and is before the third time, and determine that the specified condition is not met when the region is moved or widened in one direction, although the at least one of the area of the first touch input or the pressure of the first touch input is less than or equal to a first size, and wherein the at least one of the area of the first touch input or the pressure of the first touch input is obtained at a fifth time which is between the first time and the second time and is after the third time.

12. The electronic device of claim 7, wherein the touch input device comprises at least one of:

a touch panel configured to detect contact or proximity of a touch object; or a pressure sensor configured to detect pressure applied by the touch object.

13. A touch input processing method of an electronic device, the method comprising:

obtaining touch information about a first touch input at least once after a first time when the first touch input begins to a second time when the first touch input is released;

obtaining at least one of an area of the first touch input or a pressure of the first touch input based on the obtained touch information; and executing a function corresponding to release of the first touch input when the at least one of the area of the first touch input or the pressure of the first touch input meets a specified condition, wherein the executing of the function further comprises determining that the specified condition is met when the at least one of the area of the first touch input or the pressure of the first touch input is less than or equal to a first size and is reduced a specified number of times.

14. The method of claim 13, further comprising:

disregarding the touch information about the first touch input after executing the function corresponding to the release of the first touch input.

15. The method of claim 13, further comprising:

determining that the specified condition is met when the at least one of the area of the first touch input or the pressure of the first touch input is less than or equal to a first size.

* * * * *